(12) United States Patent
Chakraborty et al.

(10) Patent No.: US 8,314,177 B2
(45) Date of Patent: Nov. 20, 2012

(54) POLYMER NANOCOMPOSITE

(75) Inventors: Soma Chakraborty, Houston, TX (US);
Ping Duan, Cypress, TX (US); Gaurav Agrawal, Aurora, CO (US); Michael H. Johnson, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 48 days.

(21) Appl. No.: 12/878,538

(22) Filed: Sep. 9, 2010

(65) Prior Publication Data
US 2012/0065311 A1    Mar. 15, 2012

(51) Int. Cl.
*C08K 3/34* (2006.01)
*C08K 5/00* (2006.01)

(52) U.S. Cl. ........................ 524/445; 524/364
(58) Field of Classification Search .................. 524/445
See application file for complete search history.

(56) References Cited

U.S. PATENT DOCUMENTS

| | | | |
|---|---|---|---|
| 7,745,528 B2 * | 6/2010 | Prud'Homme et al. | 524/495 |
| 7,758,841 B2 | 7/2010 | Billups et al. | |
| 2004/0013597 A1 | 1/2004 | Mao et al. | |
| 2004/0053037 A1 | 3/2004 | Koch et al. | |
| 2004/0229983 A1 * | 11/2004 | Winowiecki | 524/127 |
| 2006/0199770 A1 | 9/2006 | Bianco et al. | |
| 2007/0107908 A1 | 5/2007 | Vaidya et al. | |
| 2007/0142547 A1 | 6/2007 | Vaidya et al. | |
| 2008/0306225 A1 | 12/2008 | Prud'homme et al. | |
| 2009/0036605 A1 * | 2/2009 | Ver Meer | 525/55 |
| 2009/0155578 A1 | 6/2009 | Zhamu et al. | |
| 2009/0198009 A1 | 8/2009 | Matsuki et al. | |
| 2010/0059726 A1 | 3/2010 | Jung et al. | |
| 2010/0096597 A1 | 4/2010 | Prud' Homme et al. | |
| 2010/0130701 A1 | 5/2010 | Lahdensuo | |

FOREIGN PATENT DOCUMENTS

| KR | 10-2004-0095581 A | 11/2004 |
|---|---|---|
| KR | 10-0620615 B1 | 9/2006 |
| KR | 10-2007-0053164 A | 5/2007 |
| KR | 10-2009-0014186 A | 2/2009 |
| KR | 10-2009-0086536 A | 8/2009 |
| WO | 03/103854 A1 | 12/2003 |
| WO | 2008/048705 A2 | 4/2008 |
| WO | 2008045778 A1 | 4/2008 |
| WO | 2008130431 A2 | 10/2008 |

OTHER PUBLICATIONS

Borondics, et al.; "Functionalization of Carbon Nanotubes Via Dissolving Metal Reductdions"; Journal of Nanoscience and Nanotechnology; 7; pp. 1551-1559; (2007).
Chakraborty, et al.; "Reductive Alkylation of Fluorinated Graphite"; Chem. Mater.; 20; pp. 3134-3136; (2008).
Chattopadhyay, et al.; "Carbon Nanotube Salts. Arylation of Single-Wall Carbon Nanotubes"; Organic Letters; 7 (19); pp. 4067-4069; (2005).
Deanna N. Busick, et. al.; Effects of graphite content on the morphology and barrier properties of poly(vinylidene fluoride) composites; Polymer 40; 1999; pp. 6023-6029.
Hannes C. Schniepp, et. al.; Functionalized Single Graphene Sheets Derived from Splitting Graphite Oxide; The Journal of Physical Chemistry Letters, vol. 110; 2006; pp. 8535-8539.
Lee et al.; "Layer-by-Layer Assembly of All Carbon Nanotube Ultrathin Films for Electrochemical Applications"; J. Am. Chem. Soc., 131 (2); pp. 671-679; (2009).
Liang, et al.; "A Convenient R oute to Functionalized Carbon Nanotubes"; Nano Letters; 4(7); pp. 1257-1260; (2004).
Nina I. Kovtyukhova, et. al.; Layer-by-Layer Assembly of Ultrathin Composite Films from Micron-Sized Graphite Oxide Sheets and Polycations; Chem. Mater, vol. 11, No. 3; 1999; pp. 771-778.
Sasha Stankovich, et. al. Graphene-based composite materials; Nature 04969, vol. 442; 2006; pp. 282-286.
Shen, et al.; "Layer-by-Layer Self-Assembly of Graphene Nanoplatelets"; Langmuir; 25(11), pp. 61-22-6128; (2009).
Stephenson, et al.; "Highly Functionalized and Soluble Multiwalled Carbon Nanotubes by Reductive Alkylation and Arylation: The Billups Reaction"; Chem. Mater.; 18; pp. 4658-4661; (2006).
William S. Hummers Jr., et. al.; Preparation of Graphitic Oxide; J. Am. Chem. Soc.; 1957; p. 1339.
Woo-Sik Jang, et. al.; Layer-by-layer assembly of thin film oxygen barrier; Thin Solid Films, vol. 516; 2008; pp. 4819-4825.
Busick, et al., "Effects of graphite content on the morphology and barrier properties of poly(vinylidene fluoride) composites," Polymer 40: 6023-6029 (1999).
Stankovich, et al., "Graphene-based composite materials," Nature 442(20): 282-286 (2006).
Aravind Dasari et al., "Fundamental aspects and recent progress on wear/scratch damage in polymer nanocomposites," Materials Science and Engineering R 63 (2009) 31-80.
Christopher A. Dyke et al., "Covalent Functionalization of Single-Walled Carbon Nanotubes for Materials Applications," The Journal of Physical Chemistry; vol. 108, No. 51, Dec. 23, 2004, pp. 11151-11159.
Jinni Deng et al., "Mechanical and Surface Properties of Polyurethane/Fluorinated Multi-Walled Carbon Nanotubes Composites," Journal of Applied Polymer Science DOI 10.1002/app. 27625, Published online Feb. 4, 2008 in Wiley InterScience (www.interscience.wiley.com), pp. 2023-2028.
International Search Report and Written Opinion for International Application No. PCT/US2011/043033; Mailed Mar. 22, 2012; 11 pages.
International Search Report and Written Opinion for International Application No. PCT/US2011/050956; Mailed Apr. 30, 2012; 10 pages.

* cited by examiner

*Primary Examiner* — Hui Chin
(74) *Attorney, Agent, or Firm* — Cantor Colburn LLP

(57) ABSTRACT

A polymer nanocomposite comprises a polymer; and a nanoparticle derivatized to include functional groups including carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups. The variability in tensile strength and percent elongation for the polymer nanocomposite is less than the variability of these properties obtained where an underivatized nanoparticle is included in place of the derivatized nanoparticle.

15 Claims, 14 Drawing Sheets

POLYMER NANOCOMPOSITE

BACKGROUND

A downhole environment such as, for example, an oil or gas well in an oilfield or undersea environment, a geothermal borehole, a carbon dioxide sequestration hole, and other such downhole environments, may expose equipment used in these environments to severe conditions of temperature, pressure, or corrosiveness. For example, equipment such as packers, blow out preventers, drilling motors, drilling bits, etc., may be exposed to downhole conditions which may affect the integrity or performance of the element and tools, and in particular, the performance of components of these tools fabricated from plastics.

Plastic components or coatings having thermal, mechanical, and barrier properties are used in downhole environments having a variety of such different and challenging conditions. These components may, however, be damaged by high temperature, corrosive or lipophilic conditions found in downhole conditions. Where the article is an element having a rubber or plastic part or coating, downhole conditions may cause, for example, swelling by uptake of hydrocarbon oil, water or brine, or other materials found in such environments. This swelling can weaken the structural integrity of the element or cause the element to have poor dimensional stability, resulting in difficulty in placing, activating, or removing the element.

Downhole plastic components and/or coatings can be formed from polymeric nanocomposites of polymers and nano-sized additives, where the combination has desirable mechanical and/or barrier properties. Uniform (homogeneous) mixing is needed during the formation of such polymer nanocomposites to avoid problematic behavior such as gellation, and therefore mixing can pose a technical challenge.

SUMMARY

The above and other deficiencies of the prior art are overcome by, in an embodiment, a polymer nanocomposite comprising a polymer and a nanoparticle derivatized to include functional groups including carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups, wherein variability in tensile strength and percent elongation for the polymer nanocomposite is less than the variability of these properties obtained where an underivatized nanoparticle is included in place of the derivatized nanoparticle.

In another embodiment, a dispersion comprises a polymer and a nanoparticle derivatized to include functional groups including carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups, wherein variability in tensile strength and percent elongation for a polymer nanocomposite formed from the dispersion is less than the variability of these properties obtained where an underivatized nanoparticle is included in place of the derivatized nanoparticle.

In another embodiment, a polymer nanocomposite comprises a polymer comprising a urethane- or urea-linked polyester, and 0.05 to 20 wt % of a derivatized nanoparticle based on the total weight of the polymer nanocomposite, the derivatized nanoparticle including functional groups comprising carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups, wherein variability in tensile strength and percent elongation for the polymer nanocomposite is less than the variability of these properties obtained where an underivatized nanoparticle is included in place of the derivatized nanoparticle.

In another embodiment, a polymer nanocomposite comprises a polymer, and 0.05 to 20 wt % of a combination of derivatized nanographene based on the total weight of the polymer nanocomposite, the derivatized nanographene including functional groups comprising carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups, wherein the relative 3σ variability in measured percent elongation, tensile strength, or both elongation and tensile strength is less than or equal to 2%.

BRIEF DESCRIPTION OF THE DRAWINGS

Referring now to the drawings wherein like elements are numbered alike in the several Figures.

DETAILED DESCRIPTION

Figure 1:
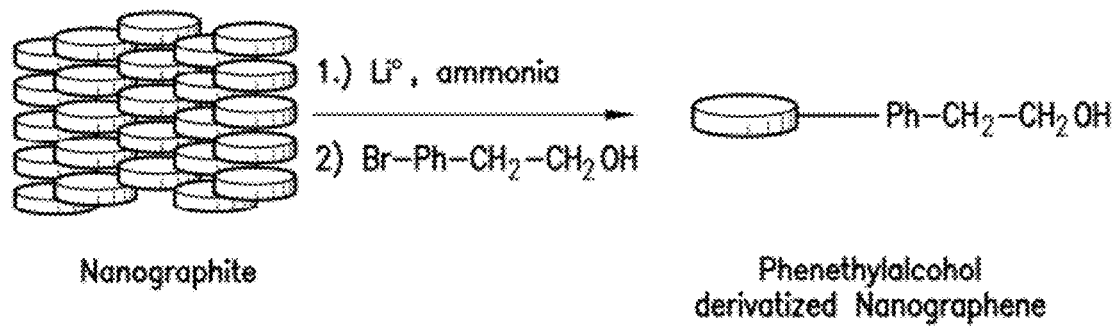
FIG. 1 shows a reaction scheme for derivatizing nanographene.

Disclosed herein is a polymer nanocomposite formed of a polymer and a derivatized nanoparticle. It has surprisingly been found that inclusion of a nanoparticle, derivatized to include a functional group such as a hydroxy, carboxy, epoxy, or other functional group, possesses improved mechanical properties such as percent elongation, tensile strength, and other properties, relative to the polymer unmodified with a derivatized nanoparticle, or to an otherwise identical polymer nanocomposite prepared with nanoparticles that have not been derivatized. Furthermore, it has also surprisingly been found that the variability in mechanical properties, including those mentioned above, is significantly reduced when a derivatized nanoparticle is included in the composite, when compared with inclusion of an non-derivatized nanoparticle. In this way, the mechanical properties of composites of any of a variety of polymeric materials, such as, for example, polyurethanes and polyurethane foams, can be enhanced to provide more mechanically and dimensionally robust articles able to withstand challenging downhole conditions of high temperature, pressure, and corrosiveness.

The polymer nanocomposite includes a polymer and derivatized nanoparticle. The nanoparticles are derivatized to include chemical functional groups to increase dispersibility, reactivity, surface properties, compatibility, and other desirable properties. Combinations comprising derivatized and non-derivatized nanoparticles may also be used.

Nanoparticles, from which the derivatized nanoparticles are formed, are generally particles having an average particle size, in at least one dimension, of less than one micrometer ($\mu m$). As used herein "average particle size" refers to the number average particle size based on the largest linear dimension of the particle (sometimes referred to as "diameter"). Particle size, including average, maximum, and minimum particle sizes, may be determined by an appropriate method of sizing particles such as, for example, static or dynamic light scattering (SLS or DLS) using a laser light source. Nanoparticles may include both particles having an average particle size of 250 nm or less, and particles having an average particle size of greater than 250 nm to less than 1 $\mu m$ (sometimes referred in the art as "sub-micron sized" particles). In an embodiment, a nanoparticle may have an average particle size of about 0.01 to about 500 nanometers (nm), specifically 0.05 to 250 nm, more specifically about 0.1 to about 150 nm, more specifically about 0.5 to about 125 nm, and still more specifically about 1 to about 75 nm. The nanoparticles may be monodisperse, where all particles are of the same size with little variation, or polydisperse, where the particles have a range of sizes and are averaged. Generally, polydisperse nanoparticles are used. Nanoparticles of different average particle size may be used, and in this way, the particle size distribution of the nanoparticles may be unimodal (exhibiting a single distribution), bimodal exhibiting two distributions, or multi-modal, exhibiting more than one particle size distribution.

The minimum particle size for the smallest 5 percent of the nanoparticles may be less than 0.05 nm, specifically less than or equal to 0.02 nm, and more specifically less than or equal to 0.01 nm. Similarly, the maximum particle size for 95% of the nanoparticles is greater than or equal to 900 nm, specifically greater than or equal to 750 nm, and more specifically greater than or equal to 500 nm.

The nanoparticles have a high surface area of greater than 300 $m^2/g$, and in a specific embodiment, 300 $m^2/g$ to 1800 $m^2/g$, specifically 500 $m^2/g$ to 1500 $m^2/g$.

The nanoparticle disclosed herein comprises a fullerene, a nanotube, nanographite, nanographene, graphene fiber, nanodiamonds, polysilsesquioxanes, silica nanoparticles, nano clay, metal particles, or combinations comprising at least one of the foregoing.

Fullerenes, as disclosed herein, may include any of the known cage-like hollow allotropic forms of carbon possessing a polyhedral structure. Fullerenes may include, for example, from about 20 to about 100 carbon atoms. For example, $C_{60}$ is a fullerene having 60 carbon atoms and high symmetry ($D_{5h}$), and is a relatively common, commercially available fullerene. Exemplary fullerenes may include $C_{30}$, $C_{32}$, $C_{34}$, $C_{38}$, $C_{40}$, $C_{42}$, $C_{44}$, $C_{46}$, $C_{48}$, $C_{50}$, $C_{52}$, $C_{60}$, $C_{70}$, $C_{76}$, and the like.

Nanotubes may include carbon nanotubes, inorganic nanotubes, metallated nanotubes, or a combination comprising at least one of the foregoing. Carbon nanotubes are tubular fullerene structures having open or closed ends and which may be inorganic or made entirely or partially of carbon, and may include also components such as metals or metalloids. Nanotubes, including carbon nanotubes, may be single walled nanotubes (SWNTs) or multi-walled nanotubes (MWNTs).

Nanographite is a cluster of plate-like sheets of graphite, in which a stacked structure of one or more layers of graphite, which has a plate-like two dimensional structure of fused hexagonal rings with an extended delocalized n-electron system, are layered and weakly bonded to one another through π-π stacking interaction. Nanographite has both micro- and nano-scale. dimensions, such as for example an average particle size of 1 to 20 $\mu m$, specifically 1 to 15 $\mu m$, and an average thickness (smallest) dimension in nano-scale dimensions, and an average thickness of less than 1 $\mu m$, specifically less than or equal to 700 nm, and still more specifically less than or equal to 500 nm.

In an embodiment, the nanoparticle is a graphene including nanographene and graphene fibers (i.e., graphene particles having an average largest dimension of greater than 1 mm and an aspect ratio of greater than 10, where the graphene particles form an interbonded chain). Graphene and nanographene, as disclosed herein, are effectively two-dimensional particles of nominal thickness, having of one or more layers of fused hexagonal rings with an extended delocalized π-electron system, layered and weakly bonded to one another through π-π stacking interaction. Graphene in general, and including nanographene, may be a single sheet or a stack of several sheets having both micro- and nano-scale dimensions, such as in some embodiments an average particle size of 1 to 20 $\mu m$, specifically 1 to 15 $\mu m$, and an average thickness (smallest) dimension in nano-scale dimensions of less than or equal to 50 nm, specifically less than or equal to 25 nm, and more specifically less than or equal to 10 nm. An exemplary nanographene may have an average particle size of 1 to 5 $\mu m$, and specifically 2 to 4 $\mu m$. In addition, smaller nanoparticles or sub-micron sized particles as defined above may be combined with nanoparticles having an average particle size of greater than or equal to 1 µm. In a specific embodiment, the derivatized nanoparticle is a derivatized nanographene.

Graphene, including nanographene, may be prepared by exfoliation of nanographite or by a synthetic procedure by "unzipping" a nanotube to form a nanographene ribbon, followed by derivatization of the nanographene to prepare, for example, nanographene oxide.

Exfoliation to form graphene or nanographene may be carried out by exfoliation of a graphite source such as graphite, intercalated graphite, and nanographite. Exemplary exfoliation methods include, but are not limited to, those practiced in the art such as fluorination, acid intercalation, acid intercalation followed by thermal shock treatment, and the like, or a combination comprising at least one of the foregoing. Exfoliation of the nanographite provides a nanographene having fewer layers than non-exfoliated nanographite. It will be appreciated that exfoliation of nanographite may provide the nanographene as a single sheet only one molecule thick, or as a layered stack of relatively few sheets. In an embodiment, exfoliated nanographene has fewer than 50 single sheet layers, specifically fewer than 20 single sheet layers, specifically fewer than 10 single sheet layers, and more specifically fewer than 5 single sheet layers.

Polysilsesquioxanes, also referred to as polyorganosilsesquioxanes or polyhedral oligomeric silsesquioxanes (POSS) derivatives are polyorganosilicon oxide compounds of general formula $RSiO_{1.5}$ (where R is an organic group such as methyl) having defined closed or open cage structures (closo or nido structures). Polysilsesquioxanes, including POSS structures, may be prepared by acid and/or base-catalyzed condensation of functionalized silicon-containing monomers such as tetraalkoxysilanes including tetramethoxysilane and tetraethoxysilane, alkyltrialkoxysilanes such as methyltrimethoxysilane and methyltrimethoxysilane.

Nanoclays may be used in the polymer nanocomposite. Nanoclays may be hydrated or anhydrous silicate minerals with a layered structure and may include, for example, alumino-silicate clays such as kaolins including hallyosite, smectites including montmorillonite, illite, and the like. Exemplary nanoclays include those marketed under the tradename CLOISITE® marketed by Southern Clay Additives, Inc. Nanoclays may be exfoliated to separate individual sheets, or may be non-exfoliated, and further, may be dehydrated or included as hydrated minerals. Other nano-sized mineral fillers of similar structure may also be included such as, for example, talc, micas including muscovite, phlogopite, or phengite, or the like.

Inorganic nanoparticles may also be included in the polymer nanocomposite. Exemplary inorganic nanoparticles may include a metal or metalloid carbide such as tungsten carbide, silicon carbide, boron carbide, or the like; a metal or metalloid nitride such as titanium nitride, boron nitride, silicon nitride, or the like; and/or a metal nanoparticle such as iron, tin, titanium, platinum, palladium, cobalt, nickel, vanadium, alloys thereof, or a combination comprising at least one of the foregoing.

The nanoparticles used herein are derivatized to include functional groups such as, for example, carboxy (e.g., carboxylic acid groups), epoxy, ether, ketone, amine, hydroxy, alkoxy, alkyl, aryl, aralkyl, alkaryl, lactone, functionalized polymeric or oligomeric groups, or a combination comprising at least one of the forgoing functional groups. The nanoparticles, including nanographene after exfoliation, are derivatized to introduce chemical functionality to the nanoparticle. For example, for nanographene, the surface and/or edges of the nanographene sheet is derivatized to increase dispersibility in and interaction with the polymer matrix. In an embodiment, the derivatized nanoparticle may be hydrophilic, hydrophobic, oxophilic, lipophilic, or may possess a combination of these properties to provide a balance of desirable net properties, by use of different functional groups.

In an embodiment, the nanoparticle is derivatized by, for example, amination to include amine groups, where amination may be accomplished by nitration followed by reduction, or by nucleophilic substitution of a leaving group by an amine, substituted amine, or protected amine, followed by deprotection as necessary. In another embodiment, the nanographene can be derivatized by oxidative methods to produce an epoxy, hydroxy group or glycol group using a peroxide, or by cleavage of a double bond by for example a metal mediated oxidation such as a permanganate oxidation to form ketone, aldehyde, or carboxylic acid functional groups.

Where the functional groups are alkyl, aryl, aralkyl, alkaryl, functionalized polymeric or oligomeric groups, or a combination of these groups, the functional groups may be attached directly to the derivatized nanoparticle by a carbon-carbon bond without intervening heteroatoms, to provide greater thermal and/or chemical stability, to the derivatized nanoparticle, as well as a more efficient synthetic process requiring fewer steps; by a carbon-oxygen bond (where the nanoparticle contains an oxygen-containing functional group such as hydroxy or carboxylic acid); or by a carbon-nitrogen bond (where the nanoparticle contains a nitrogen-containing functional group such as amine or amide). In an embodiment, the nanoparticle can be derivatized by metal mediated reaction with a $C_{6-30}$ aryl or $C_{7-30}$ aralkyl halide (F, Cl, Br, I) in a carbon-carbon bond forming step, such as by a palladium-mediated reaction such as the Stille reaction, Suzuki coupling, or diazo coupling, or by an organocopper coupling reaction. In another embodiment, a nanoparticle, such as a fullerene, nanotube, nanodiamond, or nanographene, may be directly metallated by reaction with e.g., an alkali metal such as lithium, sodium, or potassium, followed by reaction with a $C_{1-30}$ alkyl or $C_{7-30}$ alkaryl compound with a leaving group such as a halide (Cl, Br, I) or other leaving group (e.g., tosylate, mesylate, etc.) in a carbon-carbon bond forming step. The aryl or aralkyl halide, or the alkyl or alkaryl compound, may be substituted with a functional group such as hydroxy, carboxy, ether, or the like. Exemplary groups include, for example, hydroxy groups, carboxylic acid groups, alkyl groups such as methyl, ethyl, propyl, butyl, pentyl, hexyl, octyl, dodecyl, octadecyl, and the like; aryl groups including phenyl and hydroxyphenyl; aralkyl groups such as benzyl groups attached via the aryl portion, such as in a 4-methylphenyl, 4-hydroxymethylphenyl, or 4-(2-hydroxyethyl)phenyl (also referred to as a phenethylalcohol) group, or the like, or aralkyl groups attached at the benzylic (alkyl) position such as found in a phenylmethyl or 4-hydroxyphenyl methyl group, at the 2-position in a phenethyl or 4-hydroxyphenethyl group, or the like. In an exemplary embodiment, the derivatized nanoparticle is nanographene substituted with a benzyl, 4-hydroxybenzyl, phenethyl, 4-hydroxyphenethyl, 4-hydroxymethylphenyl, or 4-(2-hydroxyethyl)phenyl group or a combination comprising at least one of the foregoing groups.

In another embodiment, the nanoparticle can be further derivatized by grafting certain polymer chains to the functional groups. For example, polymer chains such as acrylic chains having carboxylic acid functional groups, hydroxy functional groups, and/or amine functional groups; polyamines such as polyethyleneamine or polyethyleneimine; and poly(alkylene glycols) such as poly(ethylene glycol) and poly(propylene glycol), may be included by reaction with functional groups.

The functional groups of the derivatized nanoparticle may react directly with other components in the polymeric nanocomposite, including reactive functional groups that may be present in the polymeric or monomeric constituents, leading to improved tethering/reaction of the derivatized nanoparticle with the polymeric matrix. Where the nanoparticle is a carbon-based nanoparticle such as nanographene, a carbon nanotube, nanodiamond, or the like, the degree of derivatization for the nanoparticles can vary from 1 functional group for every 5 carbon centers to 1 functional group for every 100 carbon centers depending on the functional group.

The nanoparticles can also be blended in with other, more common filler particles such as carbon black, mica, clays such as e.g., montmorillonite clays, silicates, glass fiber, carbon fiber, and the like, and combinations thereof.

The polymer nanocomposite further includes a polymer. The polymer may be any polymer useful for forming a nanocomposite for downhole or other applications. For example, the polymer may comprise fluoroelastomers, perfluoroelastomers, hydrogenated nitrile butyl rubber, ethylene-propylene-diene monomer (EPDM) rubber, silicones, epoxy, polyetheretherketone, bismaleimide, polyethylene, polyvinyl alcohol, phenolic resins, nylons, polycarbonates, polyesters, polyurethanes, tetrafluoroethylene-propylene elastomeric copolymers, or a combination comprising at least one of the foregoing resins.

Exemplary polymers include phenolic resins such as those prepared from phenol, resorcinol, o-, m- and p-xylenol, o-, m-, or p-cresol, and the like, and aldehydes such as formaldehyde, acetaldehyde, propionaldehyde, butyraldehyde, hexanal, octanal, dodecanal, benzaldehyde, salicylaldehyde, where exemplary phenolic resins include phenol-formaldehyde resins; epoxy resins such as those prepared from bisphenol A diepoxide, polyether ether ketones (PEEK), bismaleimides (BMI), nylons such as nylon-6 and nylon 6,6, polycarbonates such as bisphenol A polycarbonate, nitrile-butyl rubber (NBR), hydrogenated nitrile-butyl rubber (HNBR), high fluorine content fluoroelastomers rubbers such as those in the FKM family and marketed under the tradename VITON® (available from FKM-Industries) and perfluoroelastomers such as FFKM (also available from FKM-Industries) and also marketed under the tradename KALREZ® perfluoroelastomers (available from DuPont), and VECTOR® adhesives (available from Dexco LP), organopolysiloxanes such as functionalized or unfunctionalized polydimethylsiloxanes (PDMS), tetrafluoroethylene-propylene elastomeric copolymers such as those marketed under the tradename AFLAS® and marketed by Asahi Glass Co., ethylene-propylene-diene monomer (EPDM) rubbers, polyethylene, polyvinylalcohol (PVA), and the like. Combinations of these polymers may also be used.

In an embodiment, the polymer may be a polyurethane resin. Polyurethanes in general are condensation products of a di- or polyisocyanate and a di- or polyhydroxy compound. A chain extender, for example, those based on di- or polyamines, may alternatively or in addition be included in place of all or part of the diol charge to form the polymer composition.

Di- and polyhydroxy compounds may include, for example, diols and polyols having from 2 to 30 carbon atoms. Useful diols may include glycols including oligomeric glycols having repeating alkyleneoxy units including di-, tri- and higher glycols, or polyglycols. Exemplary diols may include ethylene glycol, propylene glycol, trimethylene glycol, 1,3-butanediol, 1,4-butanediol, bishydroxymethyl cyclohexane, neopentylglycol, diethylene glycol, hexanediol, dipropylene glycol, tripropylene glycol, polypropylene glycol, triethylene glycol, polyethylene glycol, tetraethylene glycol, oligomeric and polymeric glycols such as polyethylene glycols, polypropylene glycols, polybutylene glycols, poly(ethylene-propylene) glycols, and the like. Combinations comprising at least one of the foregoing dihydroxy compounds can be used.

Exemplary suitable polyols include triols, for example glycerol, trimethylol propane, pentaerythritol, tris(2-hydroxyethyl)isocyanurate, and the like; tetrols such as dipentaerythritol; and other sugar alcohols such as inositol, myo-inositol, sorbitol, and the like. Combinations comprising at least one of the foregoing polyhydroxy compounds can be used.

Polyurethanes are typically prepared by the condensation of a diisocyanate with a diol. Aliphatic polyurethanes having at least two urethane moieties per repeating unit are useful, wherein the diisocyanate and diol used to prepare the polyurethane comprise divalent aliphatic groups that may be the same or different. The divalent aliphatic units can be $C_2$ to $C_{30}$, specifically $C_3$ to $C_{25}$, more specifically $C_4$ to $C_{20}$ alkylene groups, including straight chain alkylene, branched chain alkylene, cycloalkylene, heteroalkylene such as oxyalkylene (including polyetheralkylene), and the like. Exemplary aliphatic diradical groups include but are not limited to ethylene; 1,2- and 1,3-propylene; 1,2-, 1,3-, and 1,4-butylene; 1,5-pentamethylene; 1,3-(2,2-dimethyl)propylene; 1,6-hexamethylene; 1,8-octamethylene; 1,5-(2,2,4-trimethyl)pentylene, 1,9-nonamethylene; 1,6-(2,2,4-trimethyl)hexylene; 1,2-, 1,3-, and 1,4-cyclohexylene; 1,4-dimethylene cyclohexane; 1,11-undecamethylene; 1,12-dodecamethylene, and the like.

Monomeric diisocyanates may be used to prepare the polyurethane. The diisocyanate component may be a monomeric $C_{4-20}$ aliphatic or $C_{4-20}$ aromatic diisocyanate. Exemplary aliphatic diisocyanates include isophorone diisocyanate; dicyclohexylmethane-4,4'-diisocyanate; 1,4-tetramethylene diisocyanate; 1,5-pentamethylene diisocyanate; 1,6-hexamethylene diisocyanate; 1,7-heptamethylene diisocyanate; 1,8-octamethylene diisocyanate; 1,9-nonamethylene diisocyanate; 1,10-decamethylene diisocyanate; 2,2,4-trimethyl-1,5-pentamethylene diisocyanate; 2,2'-dimethyl-1,5-pentamethylene diisocyanate; 3-methoxy-1,6-hexamethylene diisocyanate; 3-butoxy-1,6-hexamethylene diisocyanate; omega, omega'-dipropylether diisocyanate; 1,4-cyclohexyl diisocyanate; 1,3-cyclohexyl diisocyanate; trimethylhexamethylene diisocyanate; and combinations comprising at least one of the foregoing.

Exemplary aromatic polyisocyanates include toluene diisocyanate, methylene bis-phenylisocyanate (diphenylmethane diisocyanate), methylene bis-cyclohexylisocyanate (hydrogenated MDI), naphthalene diisocyanate, and the like.

Polymeric or oligomeric diisocyanates may also or alternatively be used to prepare a polyurethane, or a urethane- or urea-linked copolymer. Exemplary oligomeric or polymeric chains for the polymeric diisocyanates include polyurethanes, polyethers, polyester, polycarbonate, polyestercarbonates, and the like. In an embodiment, the polyisocyanate is a polymeric polyisocyanate, such as a polymer chain with terminal isocyanate groups. Useful polyisocyanates include those based on polyesters such as polyaliphatic esters including polylactones, polyarylate esters including copolymers of phthalates with phenols such as bisphenol A, dihydroxybenzenes, and the like; and poly(aliphatic-aromatic)esters such as ethylene terephthalate, butylene terephthalate, and the like.

A useful class of polyaliphatic ester-based diisocyanates is based on polylactones such as polybutyrolactones, polycaprolactones, and the like. Exemplary polyester-diisocyanates based on these polyesters include ADIPRENE® LFP 2950A and PP 1096, available from Chemtura, which are p-phenylene diisocyanate (PPDI)-terminated polycaprolactone prepolymers.

Alternatively or in addition to a dihydroxy compound, the diisocyanate may be condensed with a diamine, sometimes referred to as a chain extender. It will be appreciated that condensation of a diisocyanate with a dihydroxy compound produces a urethane linkage in the polymer backbone, whereas the condensation of diisocyanate with the diamine produces a urea linkage in the polymer backbone. Exemplary chain extenders include $C_{4-30}$ diamines. The diamines may be aliphatic or aromatic. In a specific embodiment, useful diamines include aromatic diamines such as, for example, 4,4'-bis(aminophenyl)methane, 3,3'-dichloro-4,4'-diaminodiphenyl methane (also referred to as 4,4'-methylene-bis(o-chloroaniline), abbreviated MOCA), dimethylsulfidetoluene diamine (DADMT), and the like.

The nanoparticle may be formulated as a solution or dispersion and cast or coated, or may be mechanically dispersed in a polymer resin matrix. Blending and dispersion of the nanofiller and the polymer resin may be accomplished by methods such as, for example, extrusion, high shear mixing, rotational mixing, three roll milling, and the like.

Where thermosetting polymers are used, mixing the derivatized nanoparticle with a precursor to the thermosetting polymer may be accomplished by rotational mixing, or by a reactive injection molding-type process using two or more continuous feed streams, in which the derivatized nanoparticle may be included as a component of one of the feed streams (e.g., where the polymer is a polyurethane prepared using different feed streams, the derivatized nanoparticle is included in the diisocyanate or polyol, diamine, etc. streams, or in a separate stream as a suspension in a solvent). Mixing in such continuous feed systems is accomplished by the flow within the mixing zone at the point of introduction of the components. The derivatized nanoparticle may be mixed with the thermosetting polymer precursor(s) prior to a two-fold increase in the viscosity of the derivatized nanoparticle-polymer precursor mixture, where including the derivatized nanoparticle prior to the increase in viscosity ensures uniform dispersion of the derivatized nanoparticle.

The properties of the polymer nanocomposite may be adjusted by the selection of nanofiller; for example, plate-like derivatized nanographene may be arranged or assembled in the composite by taking advantage of the intrinsic surface properties of the nanographene after exfoliation, in addition to the functional groups introduced by derivatization.

It has been found that homogeneous mixtures (i.e., nanocomposites) of derivatized nanoparticles with polymers have less variability in both tensile strength and elongation for any combination of nanoparticle and polymer, while improving mechanical properties for these composites. "Variability", as discussed herein, means the difference between the maximum and minimum in measured values for the different physical properties, for any given sample. In an embodiment, where a derivatized nanoparticle is homogeneously mixed with the polymer, the variability in physical properties, including tensile strength and percent elongation (% elongation), is less than the measurable variability of these properties obtained where an underivatized nanoparticle is used.

In an embodiment, the relative variability in physical properties (expressed as a percentage), such as for elongation and tensile strength, is less than or equal to ±2.0%, specifically less than or equal to ±1.5%, more specifically less than or equal to ±1.0% and still more specifically less than or equal to ±0.5%. In a specific embodiment, the absolute variability in tensile strength is less than or equal to ±200 MPa, specifically less than or equal to ±150 MPa, more specifically less than or equal to ±100 MPa and still more specifically less than or equal to ±75 MPa. Also in a specific embodiment, the absolute variability in percent elongation (i.e., the measured percent elongation) is less than or equal to ±25%, specifically less than or equal to ±20%, more specifically less than or equal to ±10% and still more specifically less than or equal to ±5%. In another embodiment, homogeneous mixing of the polymer and derivatized nanoparticle is carried out by a low shear mixing such as, for example, rotational mixing. The derivatized nanoparticles are thus effectively used as formulation additives to homogeneous end parts made of reactive formulations such as those based on polyurethane, rubber, and the like.

In the polymer nanocomposite, nanoparticles may be present in an amount of 0.01 to 30 wt %, specifically 0.05 to 27 wt %, more specifically 0.1 to 25 wt %, more specifically 0.25 to 22 wt %, and still more specifically 0.5 to 20 wt %, based on the total weight of the polymer nanocomposite.

In a specific embodiment, the polymer nanocomposite includes as a polymer resin a urethane- or urea-linked polyester, and 0.05 to 20 wt % of a derivatized nanoparticle based on the total weight of the polymer nanocomposite. In another specific embodiment, the polymer nanocomposite includes a polymer resin, and 0.05 to 20 wt % of a derivatized nanographene based on the total weight of the polymer nanocomposite, the derivatized nanographene including functional groups comprising carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups.

The polymer nanocomposite has a lower variation in measured properties than would be obtained where an identical but non-derivatized nanoparticle is used. In addition, the variation in measured percent elongation, tensile strength, or both elongation and tensile strength for the polymer nanocomposite is less than or equal to 5%.

The polymer and the derivatized nanoparticle may be formed into a dispersion to facilitate processing. The solvent may be an inorganic solvent such as water, including deionized water, or buffered or pH adjusted water, mineral acid, or a combination comprising at least one of the foregoing, or an organic solvent comprising an alkane, alcohol, ketone, oils, ethers, amides, sulfones, sulfoxides, or a combination comprising at least one of the foregoing.

Exemplary inorganic solvents include water, sulfuric acid, hydrochloric acid, or the like; exemplary oils include mineral oil, silicone oil, or the like; and exemplary organic solvents include alkanes such as hexane, heptane, 2,2,4-trimethylpentane, n-octane, cyclohexane, and the like; alcohols such as methanol, ethanol, propanol, isopropanol, butanol, t-butanol, octanol, cyclohexanol, ethylene glycol, ethylene glycol methyl ether, ethylene glycol ethyl ether, ethylene glycol butyl ether, propylene glycol, propylene glycol methyl ether, propylene glycol ethyl ether, and the like; ketones such as acetone, methyl-ethyl ketone, cyclohexanone methyletherketone, 2-heptanone, and the like; esters such as ethyl acetate, propylene glycol methyl ether acetate, ethyl lactate, and the like; ethers such as tetrahydrofuran, dioxane, and the like; polar aprotic solvents such as N,N-dimethylformamide, N-methylcaprolactam, N-methylpyrrolidine, dimethylsulfoxide, gamma-butyrolactone, or the like; or a combination comprising at least one of the foregoing.

The polymer, derivatized nanoparticle, and any solvent may be combined by extrusion, high shear mixing, three-roll mixing, rotational mixing, or solution mixing. In an embodiment, where a polyurethane dispersion is prepared, the dispersion may be combined and mixed in a rotational mixer.

Thus, in an embodiment, an article comprises the polymer nanocomposite. The polymer nanocomposite may be used to form all or a portion of an article. The article may be one useful for a downhole application, such as for example a packer element, a blow out preventer element, a torsional spring of a sub surface safety valve, a submersible pump motor protector bag, a blow out preventer element, a sensor protector, a sucker rod, an O-ring, a T-ring, a gasket, a sucker rod seal, a pump shaft seal, a tube seal, a valve seal, a seal for an electrical component, an insulator for an electrical component, a seal for a drilling motor, or a seal for a drilling bit.

EXAMPLES

Figure 2A:
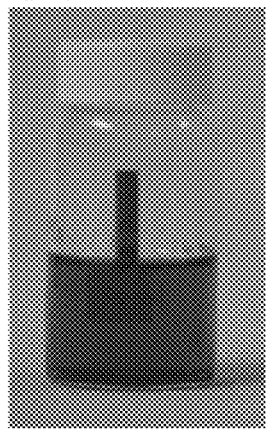
FIG. 2 is a photograph showing (A) non-derivatized nanographene suspended in N,N'-dimethylformamide (DMF), and (B) derivatized nanographene in DMF.
Figure 2B:
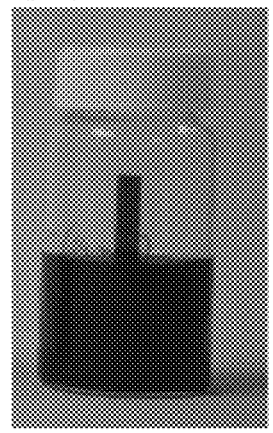

Preparation of Derivatized Nanographene. Nanographite (200 mg, having an average particle size (diameter) of about 1 to 1.5 μm, marketed as XGn nanographite, available from XG Sciences) is suspended in 200 ml of liquid ammonia in a dry ice/acetone bath. Lithium metal (480 mg) is added to the liquid ammonia solution, whereupon the solution attains a blue color indicating dissolution of lithium. When the addition of lithium is complete, the solution is stirred for 30 minutes, and 4-bromophenethylalcohol (p-Br—($C_6H_5$)—$CH_2CH_2OH$) (13.4 g) is then added slowly to the reaction mixture. The resulting solution is allowed to react for four hours at room temperature, after which ammonia is slowly removed to isolate the solid product. The resulting solid material is isolated to yield p-phenethylalcohol derivatized nanographene. This exfoliation/derivatization of nanographite is illustrated in FIG. 1. FIG. 2 is a photograph showing a comparison of freshly prepared suspensions of nanographite (FIG. 2A) in dimethylformamide (DMF), and derivatized nanographene (FIG. 2B) in DMF (derivatized with p-phenethylalcohol groups), where it is demonstrated that the derivatized nanographene remains suspended after the nanographite has settled out of solution.

Preparation of Polymer Nanocomposites. A series of polymer nanocomposites was prepared from a polycarprolactone-based p-phenylisocyanate-terminated prepolymer (marketed as ADIPRENE® 2950A, available from Chemtura) and a chain extender (MOCA diamine; marketed as VIBRACURE® A 133, and available from Chemtura), methyl ethyl ketone as solvent, and compounded with nanoparticles including Cloisite® 30B Nanoclay (available from Southern Clay Additives, Inc.), XGn platelet-type nanographite (available from XG Sciences), or functionalized nanographene, prepared as described herein. All mixing was carried out using a Thinky Rotational mixer, available from Thinky Inc. Physical variables affecting the compositions were studied, including nanoparticle loading (0, 1.0, 2.5, or 5.0 wt % based on total weight of nanoparticle (abbreviated NP), prepolymer, and chain extender), mixing time, application or absence of vacuum during processing. The polymer compositions were molded into sheets having a thickness of 2 mm, and tested for physical parameters including modulus of elasticity (in megapascals, abbreviated MPa), tensile strength (in MPa), and tensile elongation (in %), each as determined according to a standard method (ASTM D638).

Comparative Examples 1-18 and Example 1 were prepared using the above prepolymer and chain extender in the following amounts, and using the mix times and application of vacuum, as follows:

TABLE 1

| | Nanoparticle | NP load (wt %)[1] | Solvent | Mix Time (min) | Vacuum Applied (Y/N) |
|---|---|---|---|---|---|
| CEx. 1 (control) | — | — | — | 0 | N |
| CEx. 2 (control) | — | — | — | 0 | N |
| CEx. 3 (control) | — | — | — | 0 | N |
| CEx. 4 | Nanoclay | 2.5 | — | 5 | N |
| CEx. 5 | Nanoclay | 5.0 | — | 5 | N |
| CEx. 6 | Nanoclay | 2.5 | — | 5 | Y |
| CEx. 7 | Nanoclay | 5.0 | — | 5 | Y |
| CEx. 8 | Nanoclay | 2.5 | — | 30 | Y |
| CEx. 9 | Nanoclay | 5.0 | — | 30 | Y |
| CEx. 10 | Nanoclay | 2.5 | MEK | 30 | Y |
| CEx. 11 | Nanoclay | 5.0 | MEK | 30 | Y |
| CEx. 12 | XGn | 1.0 | — | 5 | N |
| CEx. 13 | XGn | 2.5 | — | 5 | N |
| CEx. 14 | XGn | 5.0 | — | 5 | N |
| CEx. 15 | XGn | 2.5 | — | 5 | Y |
| CEx. 16 | XGn | 5.0 | — | 5 | Y |
| CEx. 17 | XGn | 2.5 | — | 30 | Y |
| CEx. 18 | XGn | 5.0 | — | 30 | Y |
| Ex. 1 | Fnl_Gn | 0.9 | MEK | 30 | Y |

The above Comparative Examples 1-18 and Example 1 were then formed into sheets and samples (in triplicate) were tested for properties of tensile strength, elongation, and modulus (100% and 300% modulus). The data are summarized in Table 2, below.

TABLE 2

| Example | Sample No. | Tensile Strength (MPa) | Elongation (%) | 100% Modulus (MPa) | 300% Modulus (MPa) | Average Modulus (MPa) |
|---|---|---|---|---|---|---|
| CEx. 1 (Control) | Sample #1 | 3940.3 | 944 | 1017 | 1460.7 | — |
| | Sample #2 | 4336.7 | 983 | 1064 | 1518.6 | — |
| | Sample #3 | 3737.1 | 862 | 1029.8 | 1473.9 | — |
| | Ave. | 4004.7 | 929.7 | 1036.9 | 1484.4 | 1260.7 |
| CEx. 2 (Control) | Sample #1 | 6178.9 | 1001.1 | 1015.1 | 1614.9 | — |
| | Sample #2 | 6755.3 | 1058 | 1036.2 | 1644.4 | — |
| | Sample #3 | 6533.5 | 1011 | 1027.8 | 1643.8 | — |
| | Ave. | 6489.2 | 1023.4 | 1026.4 | 1634.4 | 1330.4 |
| CEx. 3 (Control) | Sample #1 | 6651.9 | 1015 | 976.3 | 1611.4 | — |
| | Sample #2 | 7501.4 | 1098 | 957.5 | 1583.3 | — |
| | Sample #3 | 7266.7 | 1074 | 971.4 | 1598.1 | — |
| | Ave. | 7140.0 | 1062.3 | 968.4 | 1597.6 | 1283.0 |
| CEx. 4 | Sample #1 | 5710.1 | 1149 | 999.1 | 1425.8 | — |
| | Sample #2 | 5025.8 | 1067 | 981.1 | 1436.4 | — |
| | Sample #3 | 5437.9 | 1094 | 968.9 | 1421.9 | — |
| | Ave. | 5391.3 | 1103.3 | 983.0 | 1428.0 | 1205.4 |

TABLE 2-continued

| Example | Sample No. | Tensile Strength (MPa) | Elongation (%) | 100% Modulus (MPa) | 300% Modulus (MPa) | Average Modulus (MPa) |
|---|---|---|---|---|---|---|
| CEx. 5 | Sample #1 | 2688.4 | 756 | 898.7 | 1255.6 | — |
| | Sample #2 | 2659.4 | 790 | 895.7 | 1231.2 | — |
| | Sample #3 | 2978.5 | 881 | 888.4 | 1212.7 | — |
| | Ave. | 2775.4 | 809.0 | 894.3 | 1233.2 | 1063.8 |
| CEx. 6 | Sample #1 | 6822.1 | 1065 | 1061.1 | 1683.9 | — |
| | Sample #2 | 6897.5 | 1039 | 1036.5 | 1650 | — |
| | Sample #3 | 6958.4 | 1030 | 1051.9 | 1659.9 | — |
| | Ave. | 6892.7 | 1044.7 | 1049.8 | 1664.6 | 1357.2 |
| CEx. 7 | Sample #1 | 5943.8 | 1121 | 1016 | 1499.6 | — |
| | Sample #2 | 4967.5 | 1017 | 987.8 | 1472.6 | — |
| | Sample #3 | 5433.4 | 1065 | 996.2 | 1458.3 | — |
| | Ave. | 5448.2 | 1067.7 | 1000.0 | 1476.8 | 1238.4 |
| CEx. 8 | Sample #1 | 6818.9 | 1033 | 1103.1 | 1734.6 | — |
| | Sample #2 | 6867.2 | 1060 | 1052.4 | 1664.5 | — |
| | Sample #3 | 7035.2 | 1093 | 1055.4 | 1669.8 | — |
| | Ave. | 6907.1 | 1062.0 | 1070.3 | 1689.6 | 1380.0 |
| CEx. 9 | Sample #1 | 6792.8 | 1027 | 1076.6 | 1671.3 | — |
| | Sample #2 | 6705.7 | 1057 | 1043.9 | 1631 | — |
| | Sample #3 | 7047.3 | 1069 | 1055.6 | 1629.3 | — |
| | Ave. | 6848.6 | 1051.0 | 1058.7 | 1643.9 | 1351.3 |
| CEx. 10 | Sample #1 | 6815.5 | 1074 | 1061 | 1666.9 | — |
| | Sample #2 | 7035.2 | 1087 | 1083.2 | 1704.4 | — |
| | Sample #3 | 6616 | 1025 | 1083.4 | 1726 | — |
| | Ave. | 6822.2 | 1062.0 | 1075.9 | 1699.1 | 1387.5 |
| CEx. 11 | Sample #1 | 6181.1 | 977 | 1056.2 | 1697.6 | — |
| | Sample #2 | 6966 | 1048 | 1039.6 | 1649.8 | — |
| | Sample #3 | 6946.5 | 1031 | 1057.9 | 1682.2 | — |
| | Ave. | 6697.9 | 1018.7 | 1051.2 | 1676.5 | 1363.9 |
| CEx. 12 | Sample #1 | 7491.1 | 1085 | 1130 | 1773.5 | — |
| | Sample #2 | 6984.5 | 1050 | 1100.9 | 1721.3 | — |
| | Sample #3 | 7049.1 | 1076 | 1123.2 | 1746.5 | — |
| | Ave. | 7174.9 | 1070.3 | 1118.0 | 1747.1 | 1432.6 |
| CEx. 13 | Sample #1 | 6735.2 | 1141 | 1121.1 | 1631.7 | — |
| | Sample #2 | 6727 | 1127 | 1135.6 | 1662.5 | — |
| | Sample #3 | 6218.8 | 1117 | 1085.4 | 1615.8 | — |
| | Ave. | 6560.3 | 1128.3 | 1114.0 | 1636.7 | 1375.4 |
| CEx. 14 | Sample #1 | 4512.5 | 955 | 1182.6 | 1598.5 | — |
| | Sample #2 | 3562 | 738 | 1146 | 1543.9 | — |
| | Sample #3 | 4068.5 | 854 | 1156.6 | 1580.8 | — |
| | Ave. | 4047.7 | 849.0 | 1161.7 | 1574.4 | 1368.1 |
| CEx. 15 | Sample #1 | 6024.7 | 1035 | 1134.3 | 1712.1 | — |
| | Sample #2 | 5953.8 | 1021 | 1120.1 | 1686.9 | — |
| | Sample #3 | 6013.7 | 1049 | 1140 | 1649.2 | — |
| | Ave. | 5997.4 | 1035.0 | 1131.5 | 1682.7 | 1407.1 |
| CEx. 16 | Sample #1 | 5168.3 | 950 | 1168.1 | 1679.3 | — |
| | Sample #2 | 4766.8 | 934 | 1152.8 | 1635.4 | — |
| | Sample #3 | 5759.2 | 1004 | 1164.1 | 1684.8 | — |
| | Ave. | 5231.4 | 962.7 | 1161.7 | 1666.5 | 1414.1 |
| CEx. 17 | Sample #1 | 6543.3 | 1051 | 1128.5 | 1717 | — |
| | Sample #2 | 5213.1 | 910 | 1133.8 | 1710.1 | — |
| | Sample #3 | 6716.8 | 1100 | 1132.2 | 1690.6 | — |
| | Ave. | 6157.7 | 1020.3 | 1131.5 | 1705.9 | 1418.7 |
| CEx. 18 | Sample #1 | 4823 | 971 | 1216.4 | 1665.2 | — |
| | Sample #2 | 4557.4 | 890 | 1200.2 | 1664.6 | — |
| | Sample #3 | 3966.4 | 764 | 1216.1 | 1657.5 | — |
| | Ave. | 4448.9 | 875.0 | 1210.9 | 1662.4 | 1436.7 |
| Ex. 1 | Sample #1 | 8423 | 1091 | 1087.4 | 1830.4 | — |
| | Sample #2 | 8542.9 | 1103 | 1085.3 | 1836.5 | — |
| | Sample #3 | 8270 | 1087 | 1060.9 | 1787.1 | — |
| | Ave. | 8412.0 | 1093.7 | 1077.9 | 1818.0 | 1448.0 |

Table 2 shows the data for tensile strength, % elongation, 100% and 300% modulus, and the average modulus (i.e., the average of 100% and 300% modulus) for each of the Comparative Examples (C Ex.) 1-18 and for Example (Ex.) 1 (derivatized nanographene). Samples for each of the examples and comparative example were evaluated in triplicate (Sample #1 to #3). As can be seen in the detailed data summarized in Table 2, the variability between each of the three samples for each example and comparative example, and the difference between the averages of the values, can be significant. To determine the significance of the differences between these samples, the data was analyzed by regular statistical analysis using MINITAB® Statistical Analysis Software, available from MINITAB, Inc.

Statistical Analysis of Process Variables for Controls (CEx. 1-3) and comparative Examples (CEx. 4-18). Process variables including mix time and application of vacuum were statistically evaluated for the Comparative Examples for each nanoparticle evaluated.

Average variability for all Comparative Examples 1-18 and Example 1 were obtained by calculating the maximum variability for each comparative example or example from the average of the three samples for each of CEx. 1-18 and Ex. 1, based on the maximum deviation from the average value for each for each comparative example or example the as a departure from the average value. In this way, average variability was determined from each of 19 molded plaques (corresponding to the polymer nanocomposites of CEx. 1-18 and Ex. 1) at three datapoints (samples) per plaque. The average variability is shown in Table 3, below:

TABLE 3

| Measured Property | Average Variability |
| --- | --- |
| Tensile Strength | 12.1% |
| % Elongation | 9.7% |
| 100% Modulus | 2.5% |
| 300% Modulus | 2.7% |

The resulting average variability represents the combined inherent variability for mixing, for the molding process, and for property measurement technique. As seen in Table 3, the average variability is greatest for tensile strength at 12.1%, followed by percent elongation at 9.7%. The variation in modulus, at both 100 and 300%, is lowest at 2.5% and 2.7% respectively.

Figure 3A:
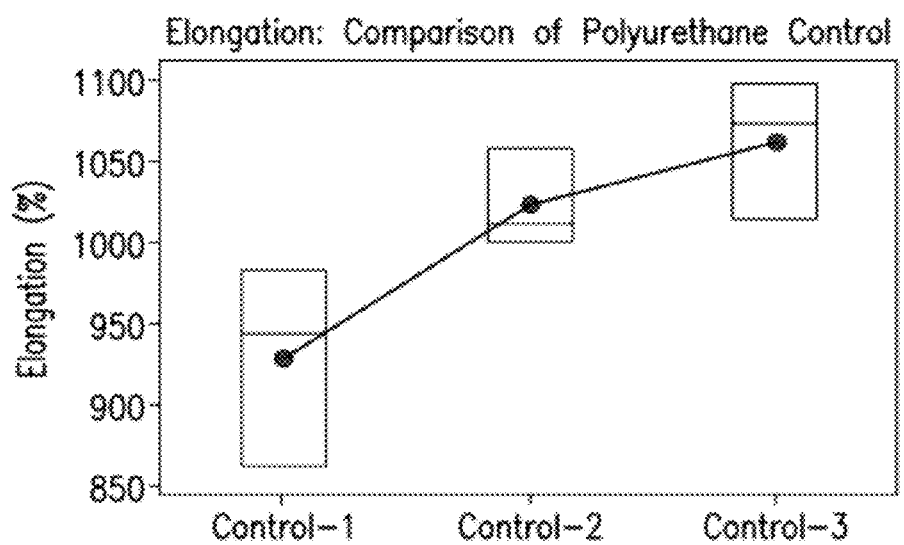
FIG. 3 shows plots of elongation (A) and of tensile strength (B) versus polymeric control examples without nanoparticle.
Figure 3B:
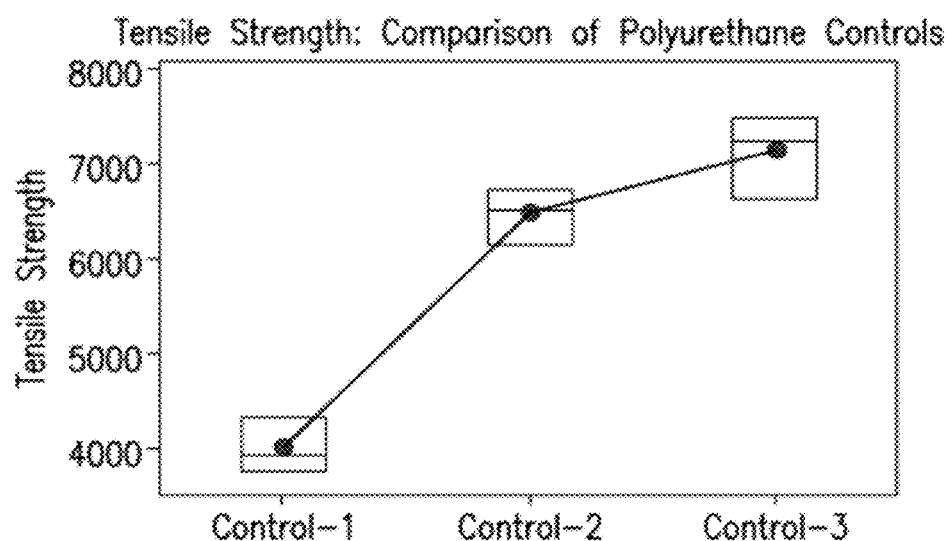

FIG. 3 shows a plot of the control samples (CEx. 1-3) for % elongation (FIG. 3A) and for tensile strength (FIG. 3B). As seen in the attached plots, the average % elongation and tensile strength values show an increasing trend from CEx. 1 (Control 1) to CEx. 3 (Control 3). However, also as seen in the plots, the data of CEx. 1 is statistically significantly lower than each of CEx. 2 and 3, which are not statistically different from each other (p=0.122 for tensile strength and p=0.288 for elongation).

Figure 4A:
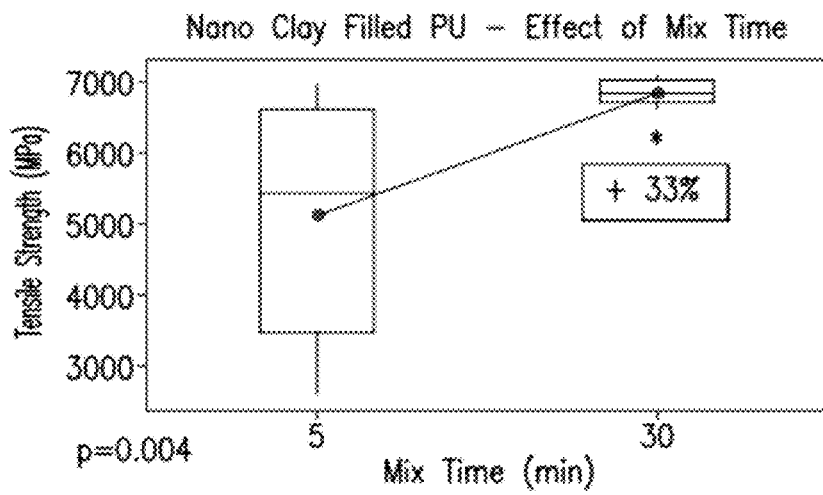
FIG. 4 shows plots of tensile strength (A), elongation (B) and average modulus (C) versus mixing time for comparative nanoclay-containing polymer composites.
Figure 4B:
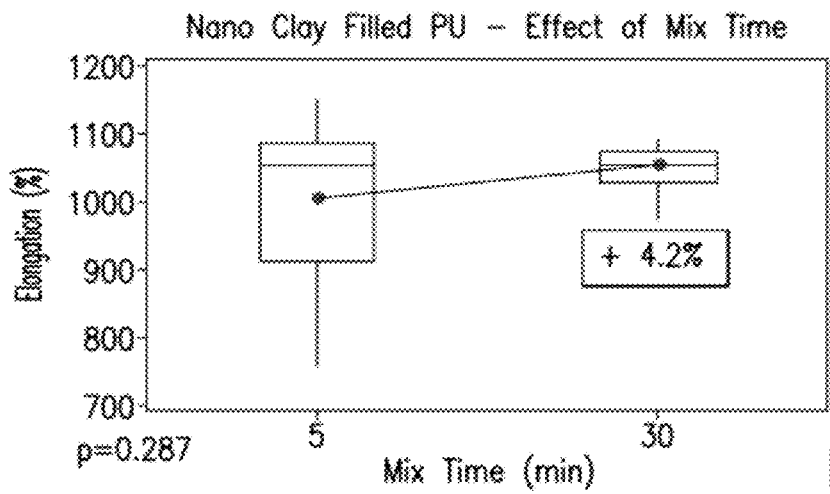
Figure 4C:
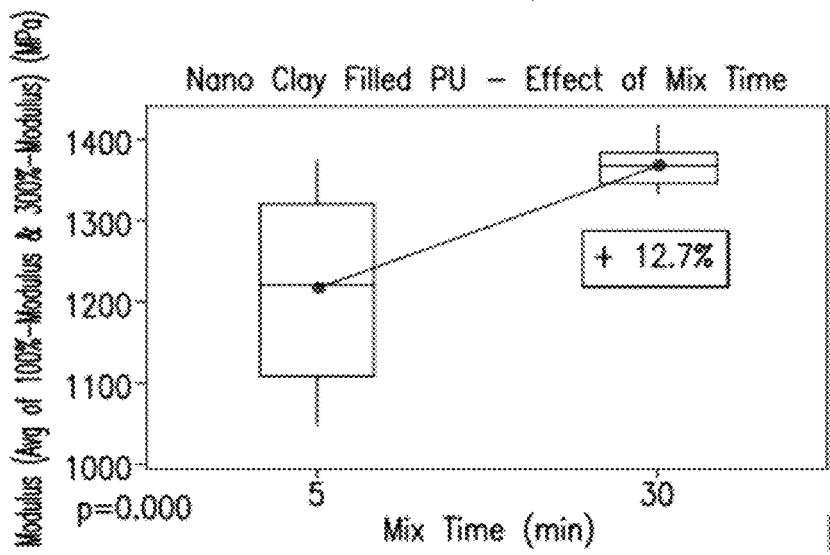

FIG. 4 shows plots of tensile strength (FIG. 4A), % elongation (FIG. 4B) and average modulus (average of 100 and 300% modulus values; FIG. 4C) for nanoclay-filled polymer nanocomposites at 5 minute (CEx. 4-7) and 30 min (CEx. 8-11) mix times. In the figures, it can be seen that the average values of tensile strength increases by 33% (FIG. 4A), by 4.2% for elongation (FIG. 4B), and by 12.7% for average modulus (FIG. 4C), but that the increase in elongation was not statistically significant (p=0.287 in FIG. 4B) whereas the increases for tensile strength (p=0.004 in FIG. 4A) and for average modulus (p=0.000 in FIG. 4C) were statistically significant.

Figure 5A:
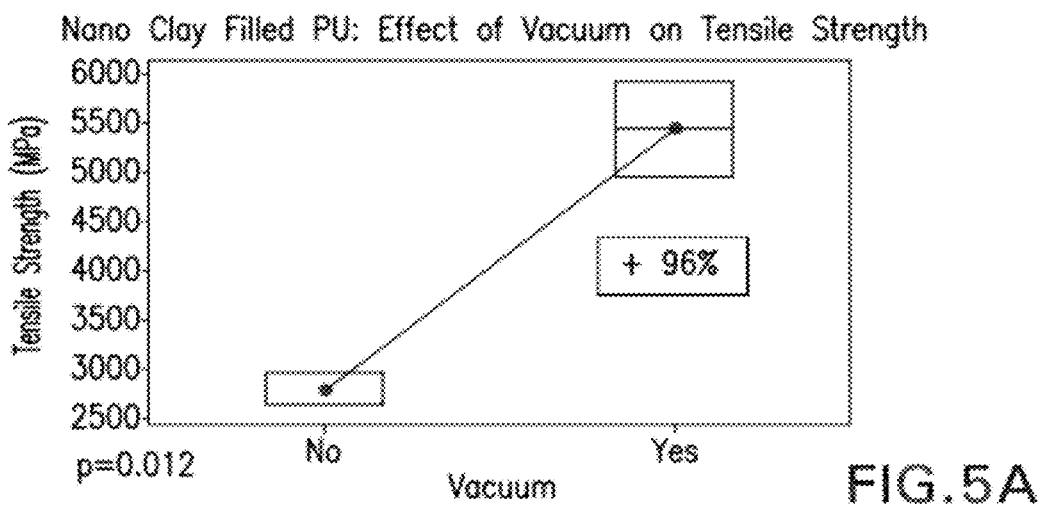
FIG. 5 shows plots of tensile strength (A), elongation (B) and average modulus (C) versus application of vacuum for comparative nanoclay-containing polymer composites.
Figure 5B:
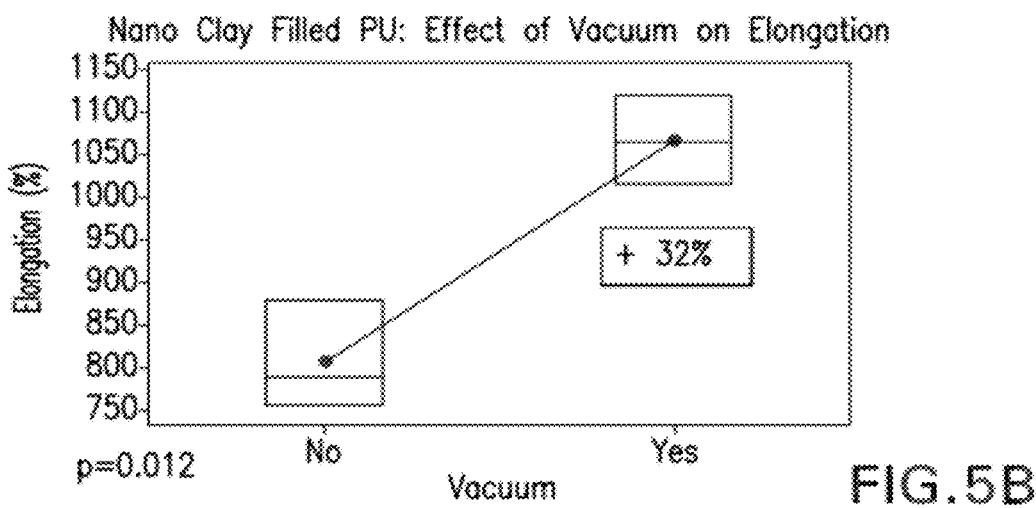
Figure 5C:
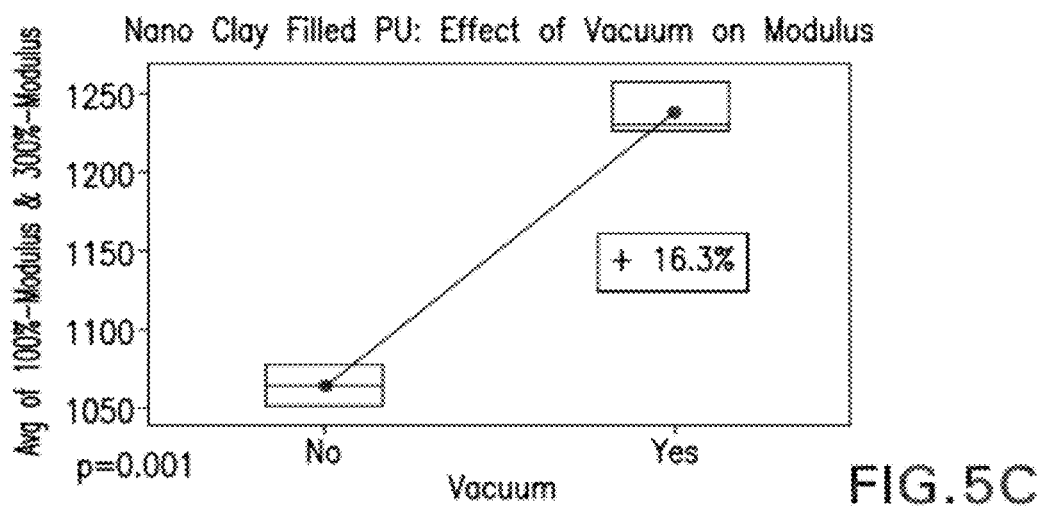

FIG. 5 shows plots of tensile strength (FIG. 5A), % elongation (FIG. 5B) and average modulus (average of 100 and 300% modulus values; FIG. 5C) for nanoclay-filled polymer nanocomposites without vacuum processing (CEx. 4 and 5) and with vacuum processing (CEx. 6 and 7). In the figures, it can be seen that the average values of tensile strength increases by 96% (FIG. 5A), by 32% for elongation (FIG. 5B), and by 16.3% for average modulus (FIG. 5C). In addition, the increases in tensile strength, elongation, and average modulus was statistically significant in all comparative examples (p=0.012 in FIG. 5A; p=0.012 in FIG. 5B; p=0.001 in FIG. 5C).

Figure 6A:
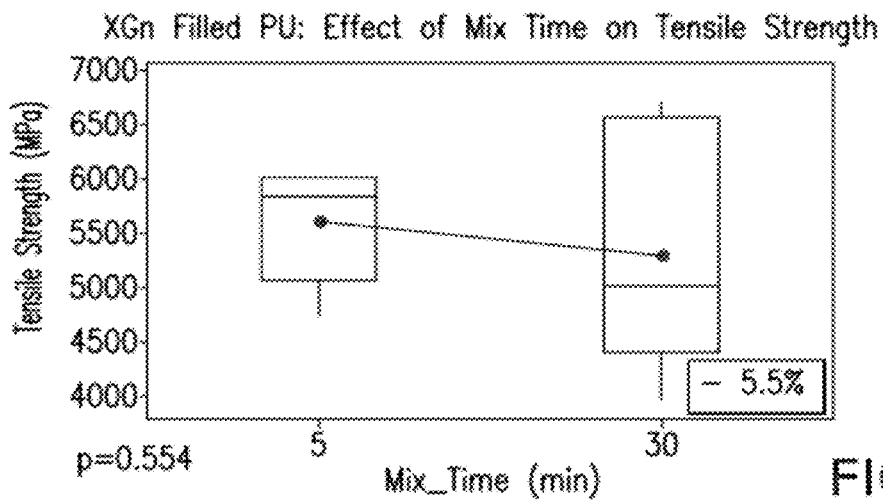
FIG. 6 shows plots of tensile strength (A), elongation (B) and average modulus (C) versus mixing time for comparative nanographite-containing polymer composites.
Figure 6B:
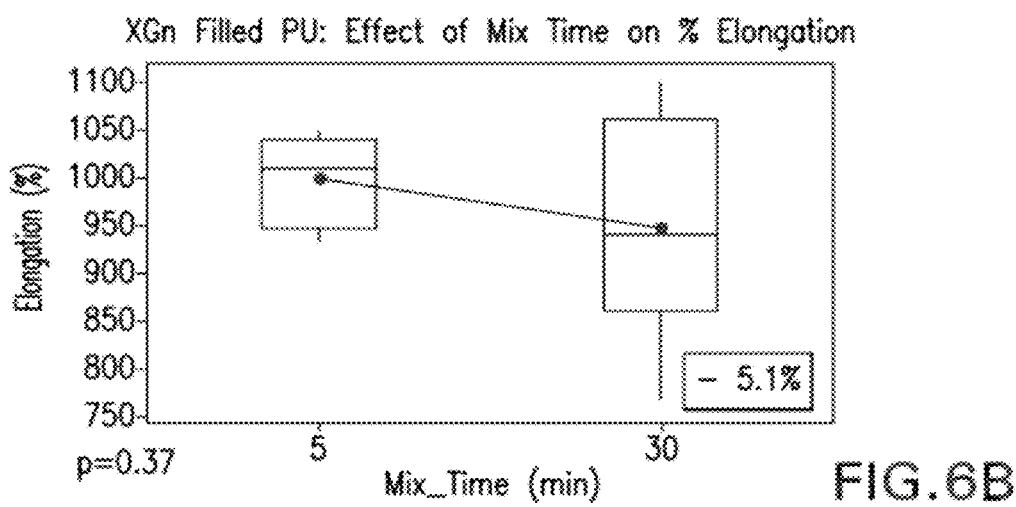
Figure 6C:
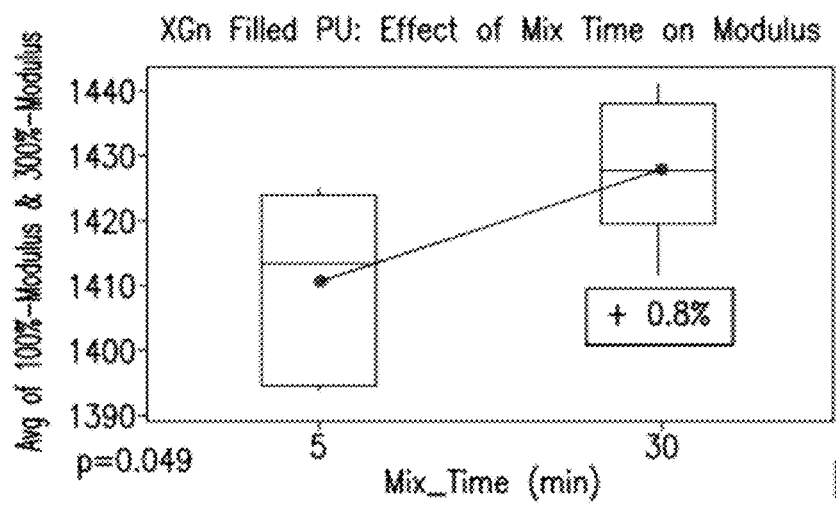

FIG. 6 shows plots of tensile strength (FIG. 6A), % elongation (FIG. 6B) and average modulus (average of 100 and 300% modulus values; FIG. 6C) for nanographite (XGn)-filled polymer nanocomposites at 5 minute (CEx. 13, 15, 17) and 30 min (CEx. 14, 16, 18) mix times. In the figures, it can be seen that the average values of tensile strength decreases by 5.5% (FIG. 6A), by 5.1% for elongation (FIG. 6B), and increases marginally by 0.8% for average modulus (FIG. 6C). In contrast to the nanoclay filler data in FIGS. 4A-4C, variability for measured tensile strength and elongation increased with the longer mixing time, whereas the variability in modulus decreased slightly; however, the decreases were not significantly different in tensile strength (p=0.554 in FIG. 6A) and elongation (p=0.370 in FIG. 6B) whereas the increases for tensile strength (p=0.049 in FIG. 6C) were marginal but statistically insignificant.

Figure 7A:
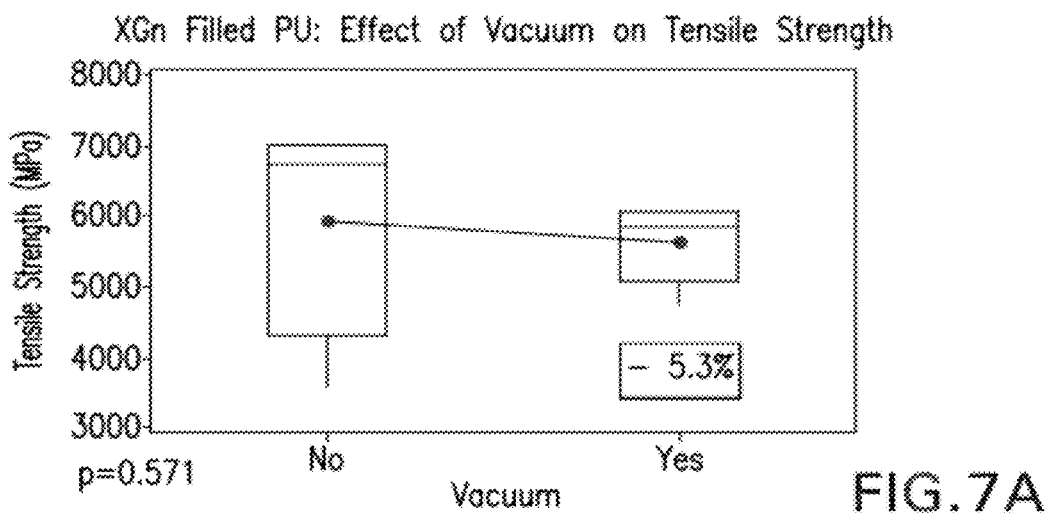
FIG. 7 shows plots of tensile strength (A), elongation (B) and average modulus (C) versus application of vacuum for comparative nanographite-containing polymer composites.
Figure 7B:
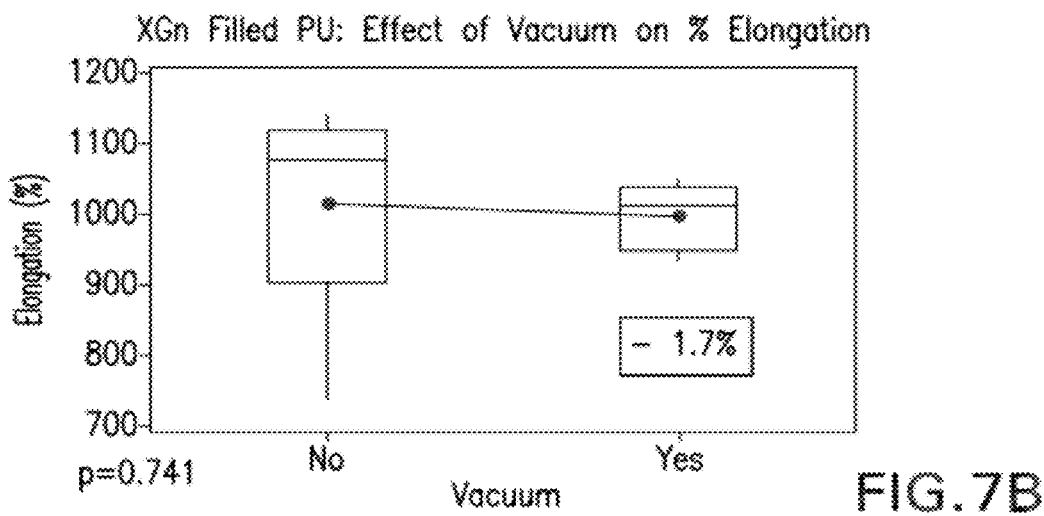
Figure 7C:
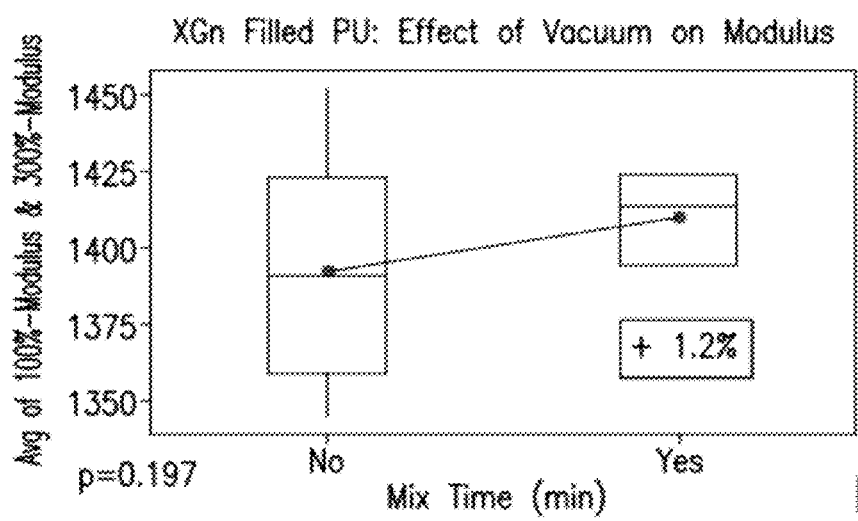

FIG. 7 shows plots of tensile strength (FIG. 7A), % elongation (FIG. 7B) and average modulus (average of 100 and 300% modulus values; FIG. 7C) for nanographite-filled polymer nanocomposites without vacuum processing (CEx. 13 and 14) and with vacuum processing (CEx. 15 and 16). In the figures, the average values decrease for tensile strength by 5.3% (FIG. 7A), and by 1.7% for elongation (FIG. 7B), but increase by 1.2% for average modulus (FIG. 7C). The changes in tensile strength, elongation, and average modulus were not statistically significant in all comparative examples (p=0.571 in FIG. 7A; p=0.741 in FIG. 7B; p=0.197 in FIG. 7C); however, it can be seen that the variability decreases in all cases with use of vacuum, hence providing for a more consistent result.

Figure 11:
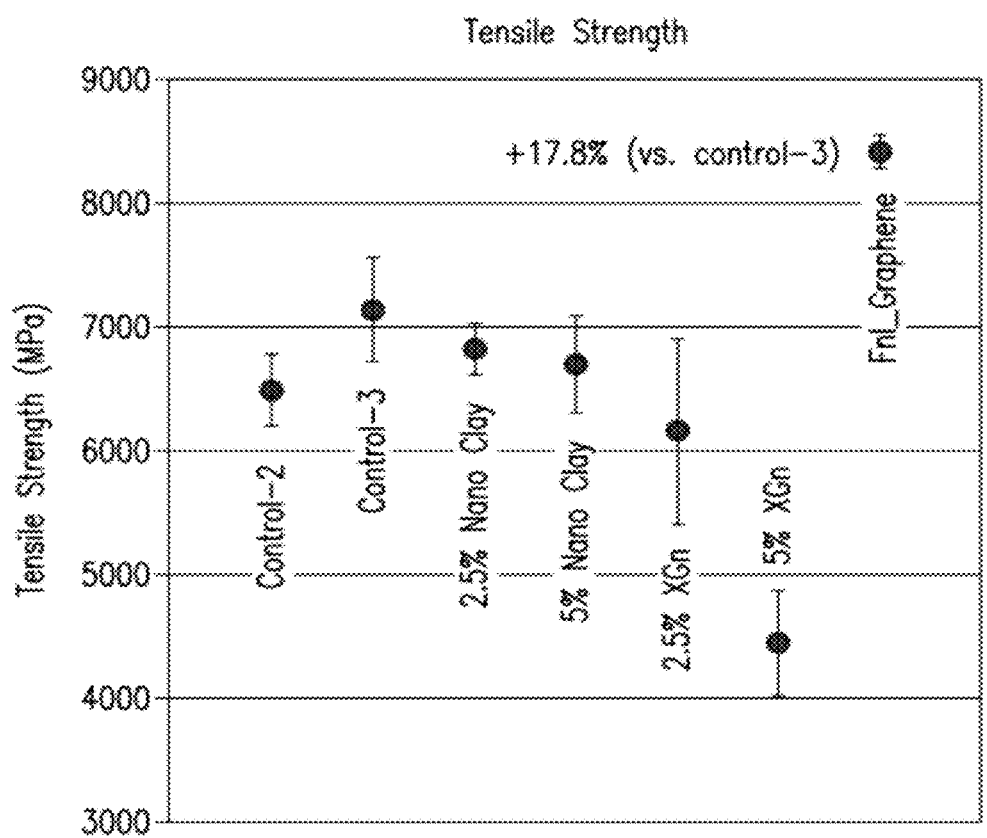
FIG. 11 is a comparative plot of tensile strength for comparative control polymers (without nanoparticles), nanoclay, and nanographite-containing polymer composites, and an exemplary derivatized nanographene-containing polymer composite.
Figure 12:
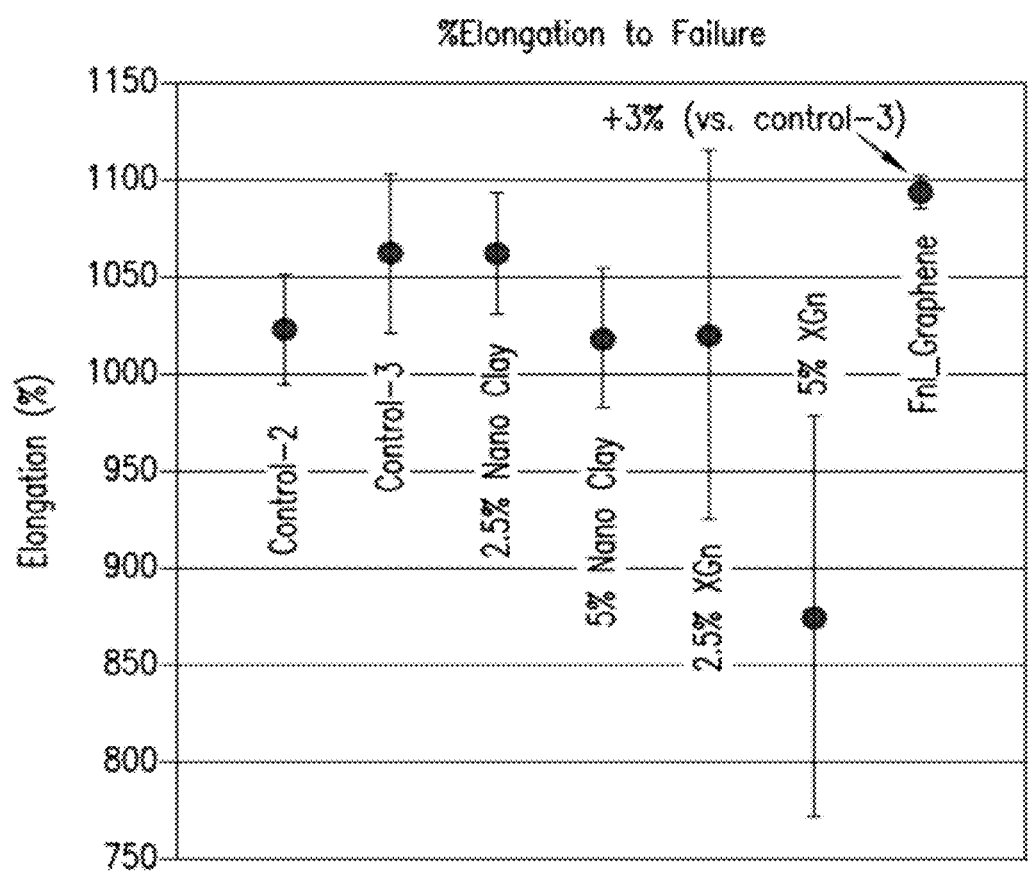
FIG. 12 is a comparative plot of elongation for comparative control polymers (without nanoparticles), nanoclay, and nanographite-containing polymer composites, and an exemplary derivatized nanographene-containing polymer composite.
Figure 13:
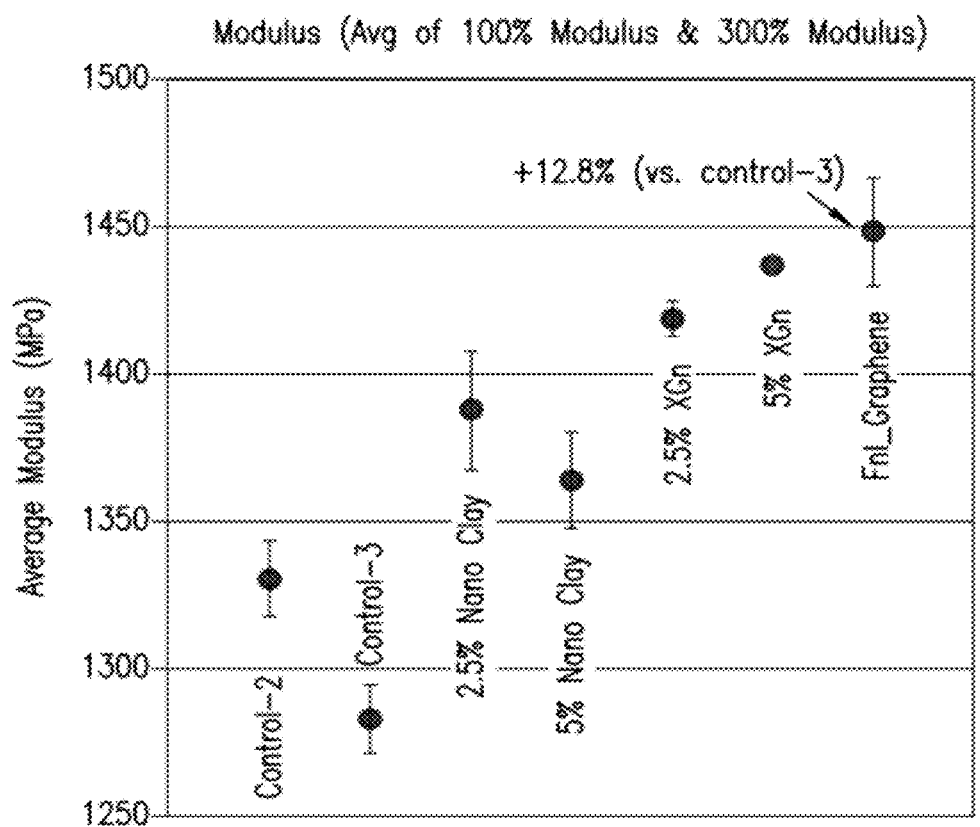
FIG. 13 is a comparative plot of average modulus for comparative control polymers (without nanoparticles), nanoclay, and nanographite-containing polymer composites, and an exemplary derivatized nanographene-containing polymer composite.
Figure 14:
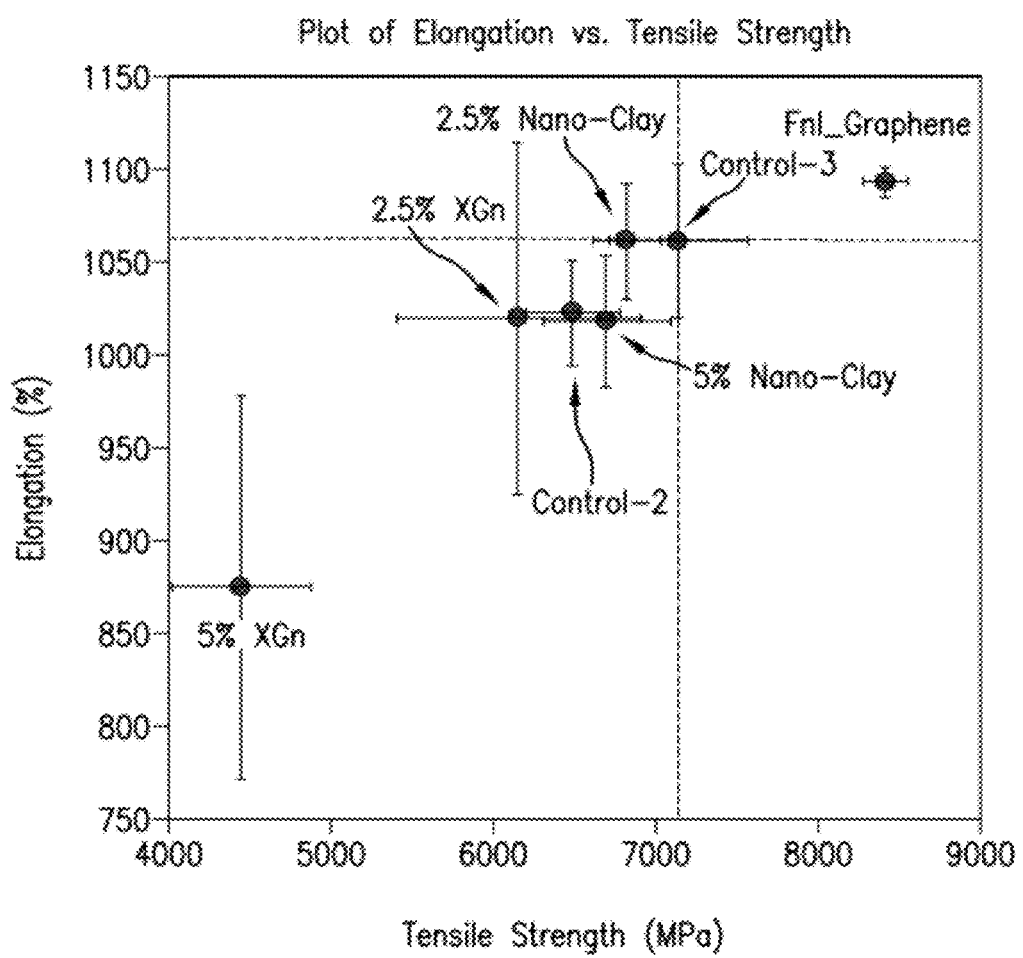
FIG. 14 is a comparative scatter plot of percent elongation versus tensile strength for comparative examples of non-derivatized nanoparticles (including nanographite) in polymer composites, and for an exemplary derivatized nanographene-containing polymer composite.

Evaluation of Nanoparticle loading. The analysis of the data for nanoparticle loading for each type of composition based on nanoparticle (nanoclay (CEx. 4-11), nanographite (CEx. 12-18), and comparison of 1 wt % nanographite (CEx. 12) with 0.9 wt % derivatized nanographene (Ex. 1) are shown in the following FIGS. 8-10, and comparisons of the data for the different nanoparticles for each measured property (tensile strength, elongation, and average modulus based on the average of 100% and 300% modulus values) are shown in FIGS. 11-13, with a further cross-plot of the averages of the samples comparing percent elongation to modulus (FIG. 14). Each compositional point (x-axis) in FIGS. 8-10 includes all data points for the triplicate samples, and the average data point calculated from these. Error bars are included for the average data point, representing 95% confidence intervals based on the observed variability determined from analysis of the samples and variability as discussed above. For all comparisons in FIGS. 8-10, the average modulus, tensile strength, and elongation values for control Comparative Example 3 were set as the baseline values.

Figure 8A:
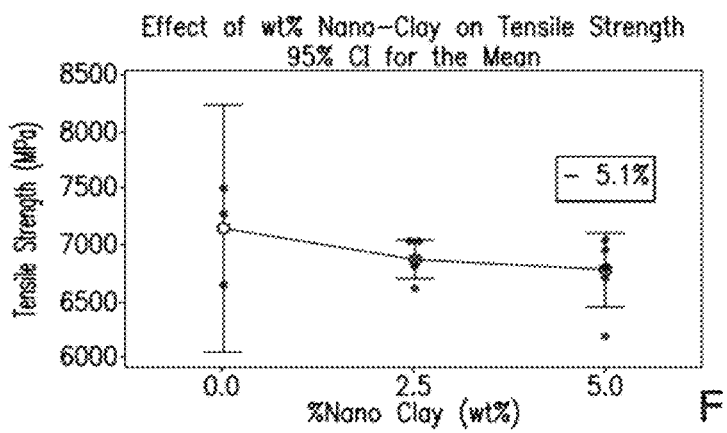
FIG. 8 shows plots of tensile strength (A), elongation (B) and average modulus (C) versus nanoparticle loading for comparative nanoclay-containing polymer composites.
Figure 8B:
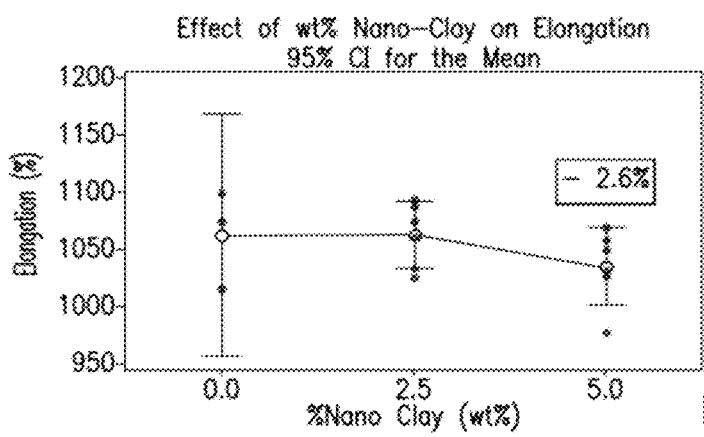
Figure 8C:
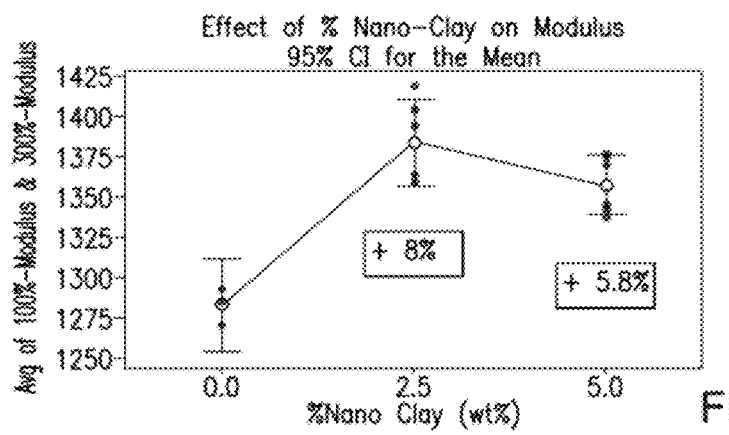

FIG. 8 shows the effect of loading on the tensile strength (FIG. 8A), elongation (FIG. 8B) and modulus (FIG. 8C) for nanoclay containing Comparative Examples 4-11, and control Comparative Example 3. As seen in the plot of the average datapoints, FIG. 8A shows a slight decrease in tensile strength of 5.1% relative to the control (CEx. 3) as the nanoclay loading is increased to 2.5 wt % and 5 wt %. Similarly, FIG. 8B shows a slight decrease in tensile strength of 2.6% relative to the control (CEx. 3) as the nanoclay loading is increased to 2.5 wt % and 5 wt %. These decreases in FIGS. 8A and 8B are not statistically significant. In FIG. 8C however, the average modulus increases by a statistically significant 8% as the nanoclay is increased from 0 to 2.5 wt %, and by a statistically significant 5.8% as the nanoclay is increased from 0 to 5.0 wt %, where it is also seen that further increasing the nanoclay levels from 2.5 wt % to 5.0 wt % results in an apparent decrease in the average modulus, which is not statistically significant. Therefore, the presence of nanoclay improves modulus but not other properties, such as tensile strength and elongation.

Figure 9A:
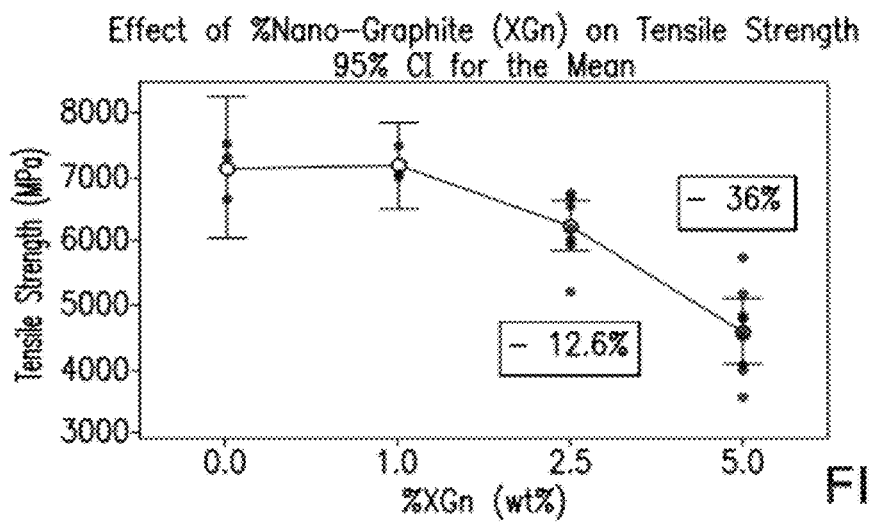
FIG. 9 shows plots of tensile strength (A), elongation (B) and average modulus (C) versus nanoparticle loading for comparative nanographite-containing polymer composites.
Figure 9B:
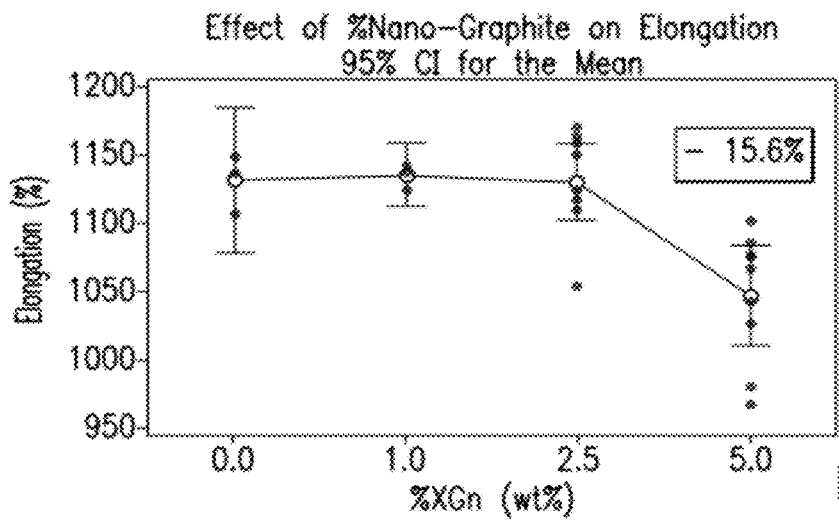
Figure 9C:
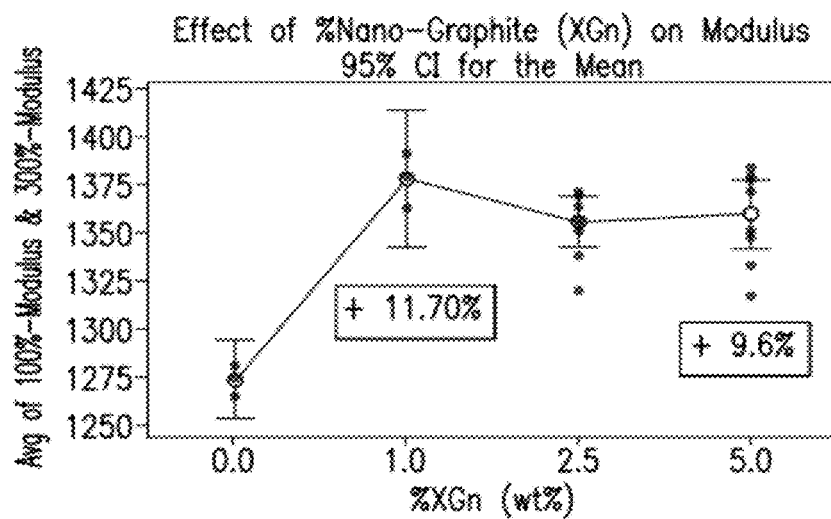

FIG. 9 shows the effect of loading on the tensile strength (FIG. 9A), elongation (FIG. 9B) and modulus (FIG. 9C) for nanographite (XGn) containing Comparative Examples 12-18, and control Comparative Examples 1-3. As seen in the plot of the average datapoints, FIG. 8A shows an overall statistically significant decrease in tensile strength of 36% (at 5.0 wt % nanographite) relative to the control (CEx. 3) as the nanographite loading is increased from 0 through 1.0 wt %, 2.5 wt % and 5 wt %. While a decrease of up to 12.6 wt % at 2.5 wt % nanographite loading, the decrease only becomes statistically significant between 2.5 wt % and 5.0 wt % nanographite. Similarly, FIG. 8B shows a decrease in elongation of 15.6% relative to the control (CEx. 3) as the nanographite loading is increased from 0 wt % to 5.0 wt %. Essentially no decrease in elongation is observed up to a nanographite loading of 2.5 wt %, where in a trend similar to that seen for tensile strength, the decrease in elongation becomes pronounced though marginally not statistically significant between 2.5 wt % and 5.0 wt % nanographite. In FIG. 8C however, the average modulus increases by a statistically significant 8% as the nanoclay is increased from 0 to 2.5 wt %, and by a statistically significant 11.7% for 1 wt % loading, and 9.6% for a 5.0 wt % loading, of the nanographite. However, increasing the nanographite levels from 1.0 wt % to 5.0 wt % results in no further increase in the average modulus; all values at these loadings are not statistically different. Therefore, the presence of nanographite improves modulus but not other properties, such as tensile strength and elongation.

Figure 10A:
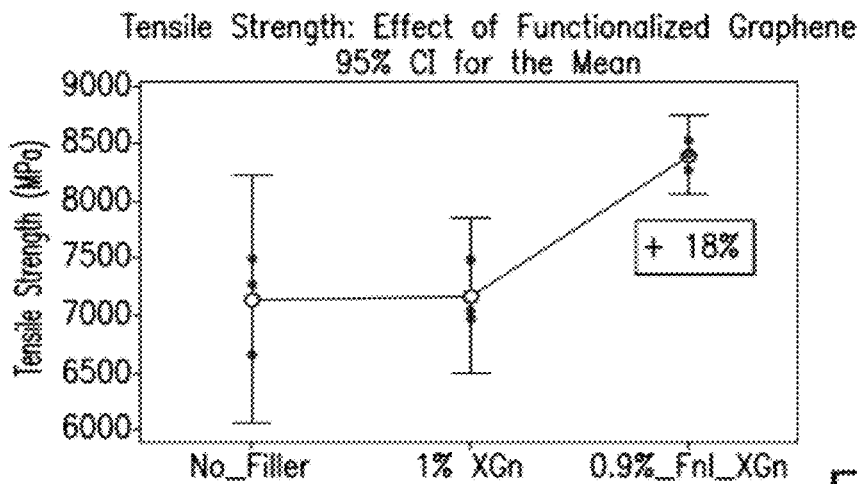
FIG. 10 shows plots of tensile strength (A), elongation (B) and average modulus (C) for the polymeric control, 1 wt % nanographite-containing comparative polymer composite, and a 0.9 wt % phenethylalcohol-derivatized nanographene-containing polymer composite.
Figure 10B:
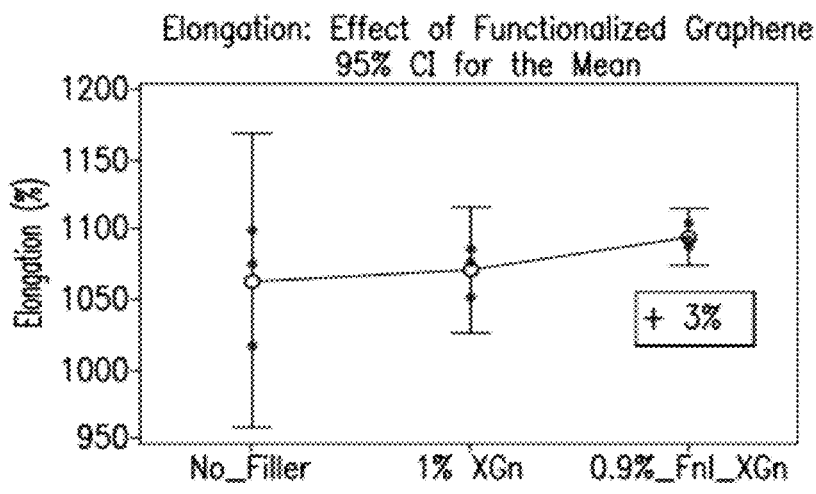
Figure 10C:
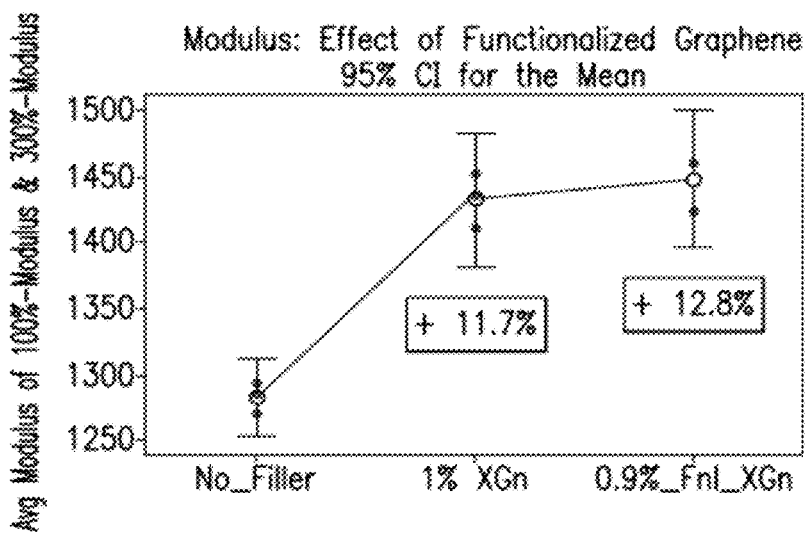

FIG. 10 shows the effect of loading on the tensile strength (FIG. 10A), elongation (FIG. 10B) and modulus (FIG. 10C) for 1 wt % nanographite (XGn) containing Comparative Example 12, and control Comparative Examples 1-3, against 0.9 wt % phenethylalcohol-derivatized nanographene (Fnl_Gn) containing Example 1. As seen in the plot of the average datapoints, FIG. 10A shows no increase in tensile strength with inclusion of 1 wt % XGn relative to the control, but an increase in tensile strength of 18% with inclusion of 0.9 wt % Fnl_Gn relative which is marginally statistically significant relative to the control (CEx. 3). The increase is, however, statistically significant between the XGn and Fnl_Gn, and the variability of the derivatized nanoparticle Fnl_Gn at 95% confidence interval is significantly smaller than that of the control and of the non-derivatized XGn. FIG. 10B shows a slight but statistically insignificant increase in elongation of 3% relative to the control (CEx. 3) for the derivatized nanographene Fnl_Gn at 0.9 wt %; the increase in elongation is not statistically significant relative to the non-derivatized nanographite (XGn) particle. Thus, there is essentially no change in elongation for either nanoparticle; however, the variability of the derivatized nanoparticle Fnl_Gn at 95% confidence interval is significantly smaller than that of the control and of the non-derivatized XGn. In FIG. 10C, the average modulus increases by a statistically significant 11.7% for the XGn and 12.8% for the Fnl_Gn, relative to the control. However, the variability in modulus also increases for both the XGn and the Fnl_Gn relative to the control, and hence there is no statistical difference in between modulus for the XGn and Fnl_Gn. Therefore, the use of derivatized nanographene improves tensile strength relative to the non-derivatized nanographite, and significantly reduces variability in tensile strength and elongation though the average modulus is statistically the same for XGn and Fnl_Gn.

FIG. 11 summarizes the tensile strength values for Control 2 (CEx. 2), Control 3 (CEx. 3), 2.5 wt % nanoclay (CEx. 8), 5 wt % nanoclay (CEx. 9), 2.5 wt % XGn (CEx. 17), 5 wt % XGn (CEx. 18), and the phenethylalcohol-derivatized nanographene (Fnl_Gn; Ex. 1). In the figure, it is clearly seen (relative to Control 3) that a trend of decreasing tensile strength is observed for 2.5 wt % nanoclay, 5 wt % nanoclay, 2.5 wt % nanographite, and 5 wt % nanographite, but that a significant increase of 17.8% in tensile strength is seen for the phenethylalcohol-derivatized nanographene (Ex. 1) even at the lower loading of 0.9 wt %. Furthermore, the variation in tensile strength is much smaller for the phenethylalcohol-derivatized nanographene of Ex. 1 than for any of the controls or comparative examples.

FIG. 12 summarizes the % elongation values for Control 2 (CEx. 2), Control 3 (CEx. 3), 2.5 wt % nanoclay (CEx. 8), 5 wt % nanoclay (CEx. 9), 2.5 wt % XGn (CEx. 17), 5 wt % XGn (CEx. 18), and the phenethylalcohol-derivatized nanographene (Fnl_Gn; Ex. 1). In the figure, no statistical difference exists between Control 3 (CEx. 3) and any of the other comparative examples or Ex. 1, except for the 5 wt % value for trend of decreasing tensile strength is observed for 2.5 wt % nanoclay, 5 wt % nanoclay, 2.5 wt % nanographite, and 5 wt % nanographite, but that a significant increase of 17.8% in tensile strength is seen for the phenethylalcohol-derivatized nanographene (Ex. 1) even at the lower loading of 0.9 wt %. Furthermore, the variation in tensile strength is much smaller for the phenethylalcohol-derivatized nanographene of Ex. 1 than for any of the controls or comparative examples.

FIG. 13 summarizes the average modulus values for Control 2 (CEx. 2), Control 3 (CEx. 3), 2.5 wt % nanoclay (CEx. 8), 5 wt % nanoclay (CEx. 9), 2.5 wt % XGn (CEx. 17), 5 wt % XGn (CEx. 18), and the phenethylalcohol-derivatized nanographene (Fnl_Gn; Ex. 1). In the figure, a general trend of increasing modulus is seen for the progression of Control 3, 2.5 wt % and 5 wt % nanoclay (noting that 5.0 wt % nanoclay has a lower average modulus than the 2.5 wt % nanoclay, but that these compositions are not statistically different), 2.5 wt % XGn, 5.0 wt % XGn, and derivatized nanographene (noting that that no statistical difference exists between the derivatized nanographene (Fnl_graphene) and the 5 wt % XGn. The derivatized nanographene has an average modulus 12.8% higher than that of Control 3 (CEx. 3) even at a low loading of 0.9 wt %; however, the variability of the derivatized nanographene is greater than that of the non-derivatized nanographite and comparable to that of the nanoclay.

FIG. 14 summarizes the data of FIGS. 11 and 12, plotting the data to show the net effect of the use of derivatized nanographene (Fnl_Gn) relative to the non-derivatized nanoclay or nanographite (XGn). The plot emphasizes that the derivatized nanographene has a combination of properties that are greater than that of the non-derivatized nanoparticles. The derivatized nanographene has a higher average elongation relative to all the comparative examples, and while not statistically higher than Control 3, 2.5 wt % XGn, and 2.5 wt % nanoclay, the variability is much smaller; in particular, as seen in the error bars in FIG. 14, for 0.9 wt % Fnl_XGn, the variability in % elongation is ±4.25%, whereas the variability for Control 3, 2.5 wt % XGn, and 2.5 wt % nanoclay samples are ±74.7%, ±85.5%, and ±28.3%, respectively. This translates to a relative variability of ±0.27% for the Fnl_XGn, which is significantly lower than the next nearest comparative example of 2.5 wt % nanoclay at ±3.05%. The tensile strength is also both greater than that seen in the comparative examples and with much lower variability; in particular, as seen in the error bars in FIG. 14, for 0.9 wt % Fnl_XGn, the variability in tensile strength is ±70 MPa, whereas the variability for Control 3, 2.5 wt % XGn, and 2.5 wt % nanoclay samples are ±435 MPa, ±753 MPa, and ±211 MPa, respectively. This translates to a relative variability of ±0.39% for the Fnl_XGn, which is significantly lower than the next nearest comparative example of 2.5 wt % nanoclay at ±2.66%. The significantly reduced variability in these properties in the derivatized nanographene demonstrates that derivatized nanoparticles, and in particular derivatized nanographene, can exhibit both improved properties and lower variability (and hence, greater process control) than can be obtained when non-derivatized nanoparticles are used, even when other parameters such as test error, mixing variability, particle loading, and the use of vacuum processing are accounted for in the data.

Figure 15:
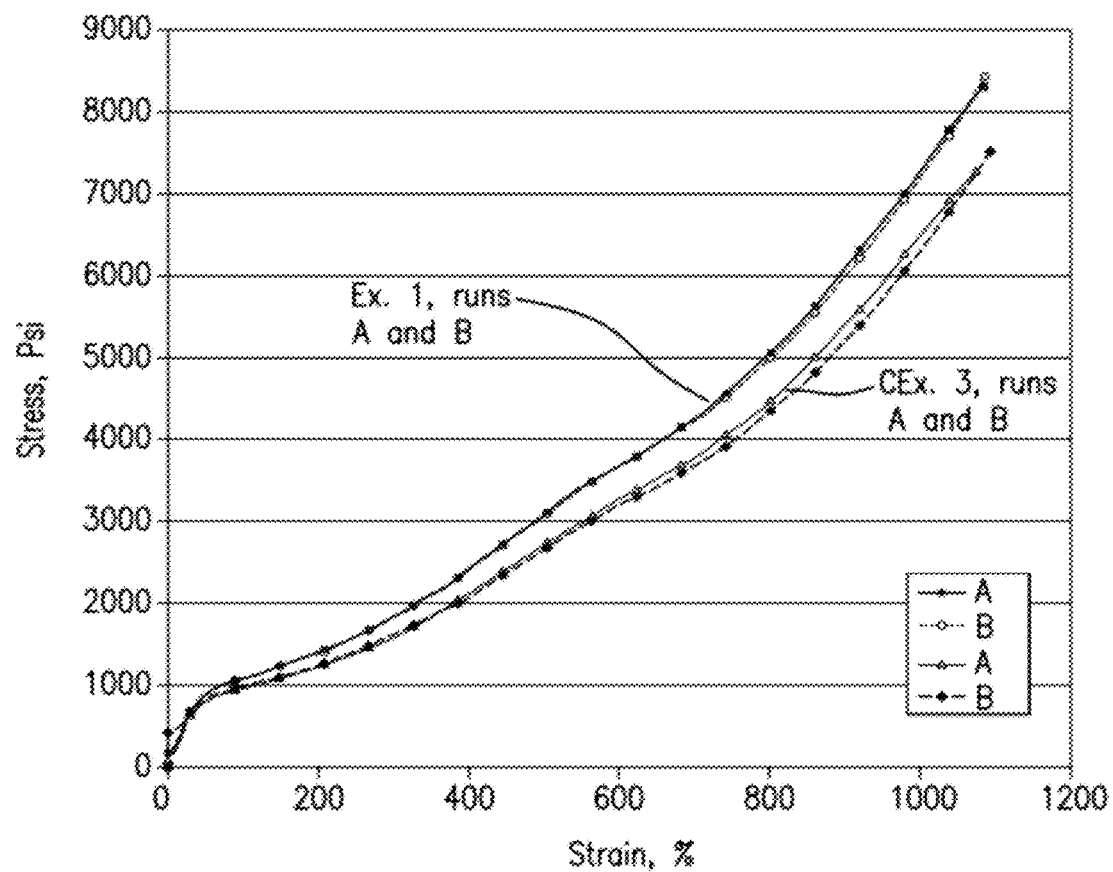
FIG. 15 is a plot of stress versus strain for a control comparative example of a polyurethane nanocomposite and an exemplary polyurethane nanocomposite with derivatized nanographene.

In addition, FIG. 15 shows a plot of stress (in psi) vs. strain (%) for samples of CEx. 3 (duplicate runs A and B) and for Ex. 1 (duplicate runs A and B). The plot shows an increasing stress with increasing strain, indicative of improved (increased) strain hardening, for the composition of Example 1 over that of the control Comparative Example 3.

To summarize, addition of as little as 0.9 wt % of nanographene derivatized with phenethylalcohol groups provides about 18% higher tensile strength, about 3% higher elongation, and about 13% higher modulus when compared with an unfilled polymeric (polyurethane) polymer control. Furthermore, inclusion of derivatized nanographene appears to reduce statistical variation in measured properties of both tensile strength and percent elongation, indicative of good dispersion and positive interaction with a polymer matrix. Thus functionalized graphene can be used as a dispersion aid in polymers including urethane or urea-linked polyesters.

While one or more embodiments have been shown and described, modifications and substitutions may be made thereto without departing from the spirit and scope of the invention. Accordingly, it is to be understood that the present invention has been described by way of illustrations and not limitation.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The invention claimed is:

1. A polymer nanocomposite comprising:
a polymer; and
a nanoparticle derivatized to include functional groups including carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups,
wherein the polymer and nanoparticle derivatized to include functional groups are selected such that a variability in tensile strength and percent elongation for the polymer nanocomposite is less than the variability of these properties obtained where an underivatized nanoparticle is included in place of the derivatized nanoparticle.

2. The polymer nanocomposite of claim 1, wherein the polymer comprises fluoroelastomers, perfluoroelastomers, hydrogenated nitrile butyl rubber, ethylene-propylene-diene monomer (EPDM) rubber, silicones, epoxy, polyetheretherketone, bismaleimide, polyethylene, polyvinyl alcohol, phenolic resins, nylons, polycarbonates, polyesters, polyurethanes, tetrafluoroethylene-propylene elastomeric copolymers, or a combination comprising at least one of the foregoing polymers.

3. The polymer nanocomposite of claim 1, wherein the nanoparticle comprises a fullerene, a nanotube, nanographite, nanographene, graphene fiber, nanodiamonds, polysilsesquioxanes, silica nanoparticles, nano-clay, metal particles, or combinations comprising at least one of the foregoing.

4. The polymer nanocomposite of claim 3, wherein the nanotubes are single or multiwall nanotubes including carbon nanotubes, inorganic nanotubes, metallated nanotubes, or a combination comprising at least one of the foregoing.

5. The polymer nanocomposite of claim 1, wherein the derivatized nanoparticle is a derivatized nanographene, the functional groups are alkyl, aryl, aralkyl, alkaryl, functionalized polymeric or oligomeric groups, or a combination of these groups, and the functional groups are attached directly to the derivatized nanoparticle by a carbon-carbon bond without intervening heteroatoms; by a carbon-oxygen bond; or by a carbon-nitrogen bond.

6. The polymer nanocomposite of claim 5, wherein preparing the derivatized nanographene includes exfoliation of nanographite by fluorination, acid intercalation, acid intercalation followed by thermal shock treatment, or a combination comprising at least one of the foregoing.

7. The polymer nanocomposite of claim 3, wherein metal particles include iron, tin, titanium, platinum, palladium, cobalt, nickel, vanadium, alloys thereof, or a combination comprising at least one of the foregoing.

8. The polymer nanocomposite of claim 1, wherein the aspect ratio of the nanoparticles is 0.1 to 200.

9. The polymer nanocomposite of claim 1, wherein the aspect ratio of the nanoparticles is greater than or equal to 10.

10. The polymer nanocomposite of claim 1, further comprising filler including carbon black, mica, clay, glass fiber, carbon fiber, or a combination comprising at least one of the foregoing.

11. An article comprising the polymer nanocomposite of claim 1.

12. The article of claim 11, wherein the article is a packer element, a blow out preventer element, a torsional spring of a sub surface safety valve, a submersible pump motor protector bag, a blow out preventer element, a sensor protector, a sucker rod, an O-ring, a T-ring, a gasket, a sucker rod seal, a pump shaft seal, a tube seal, a valve seal, a seal for an electrical component, an insulator for an electrical component, a seal for a drilling motor, or a seal for a drilling bit.

13. A polymer nanocomposite comprising:
a polymer comprising a urethane- or urea-linked polyester, and
0.05 to 20 wt % of a derivatized nanoparticle based on the total weight of the polymer nanocomposite, the derivatized nanoparticle including functional groups comprising carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups,
wherein variability in tensile strength and percent elongation for the polymer nanocomposite is less than the variability of these properties obtained where an underivatized nanoparticle is included in place of the derivatized nanoparticle.

14. The polymer nanocomposite of claim 13, wherein the relative variability in percent elongation, tensile strength, or both elongation and tensile strength for the polymer nanocomposite is less than or equal to 2%.

15. A polymer nanocomposite comprising:
a polymer, and
0.05 to 20 wt % of a derivatized nanographene based on the total weight of the polymer nanocomposite, the derivatized nanographene including functional groups comprising carboxy, epoxy, ether, ketone, amine, hydroxy, alkoxy, alkyl, aryl, aralkyl, alkaryl, lactone, functionalized polymeric or oligomeric groups, or a combination comprising at least one of the forgoing functional groups,
wherein the polymer and derivatized nanographene including functional groups are selected such that a relative variability in measured percent elongation, tensile strength, or both elongation and tensile strength is less than or equal to 2%.

* * * * *